United States Patent [19]
Lipton et al.

[11] Patent Number: 5,416,510
[45] Date of Patent: May 16, 1995

[54] CAMERA CONTROLLER FOR STEREOSCOPIC VIDEO SYSTEM

[75] Inventors: Lenny Lipton, Greenbrae; Lawrence D. Meyer, Mill Valley; Frank K. Kramer, III; William A. Slattery, both of Los Gatos, all of Calif.

[73] Assignee: StereoGraphics Corporation, San Rafael, Calif.

[21] Appl. No.: 27,365

[22] Filed: Mar. 8, 1993

Related U.S. Application Data

[63] Continuation-in-part of Ser. No. 751,883, Aug. 28, 1991, Pat. No. 5,193,000.

[51] Int. Cl.$^6$ .................... H04N 13/00; H04N 13/02
[52] U.S. Cl. ...................... 348/43; 348/386; 348/717
[58] Field of Search ............. 348/43, 47, 385, 386, 348/473, 512, 567, 568, 717; H04N 13/00, 13/02

[56] References Cited

U.S. PATENT DOCUMENTS

| | | | |
|---|---|---|---|
| 3,582,542 | 6/1971 | Smierciak | 348/385 |
| 3,674,921 | 7/1972 | Goldsmith | 348/43 |
| 3,818,125 | 6/1974 | Butterfield | 348/49 |
| 4,027,333 | 5/1977 | Kaiser et al. | 348/385 |
| 4,523,226 | 6/1985 | Lipton et al. | 348/49 |
| 4,533,936 | 8/1985 | Tiemann et al. | 348/386 |
| 4,562,463 | 12/1985 | Lipton | 348/56 |
| 4,583,117 | 4/1986 | Lipton et al. | 348/47 |
| 4,593,318 | 6/1986 | Eng et al. | 348/385 |
| 4,677,481 | 6/1987 | Nicholas | 348/184 |
| 4,704,629 | 11/1987 | Vreeswijk et al. | 348/386 |
| 4,743,965 | 5/1988 | Yamada et al. | 348/43 |
| 4,772,944 | 9/1988 | Yoshimura | 348/56 |
| 4,792,850 | 12/1988 | Lipton et al. | 348/57 |
| 4,884,876 | 12/1989 | Lipton et al. | 359/64 |
| 5,001,555 | 3/1991 | Park | 348/43 |
| 5,126,878 | 6/1992 | Trumbull et al. | 359/472 |

OTHER PUBLICATIONS

Lenny Lipton, "Binocular symmetries as criteria for the successful transmission of images in the *StereoDimensional* (TM) brand stereoscopic video system", SPIE vol. 507 Processing and Display of Three-Dimensional Data II (1984), pp. 108–113.

Lenny Lipton, "Temporal Artifacts in Field-Sequential Stereoscopic Displays", SID 91 Digest (1991), pp. 834–835.

G. R. Kennedy, "Weather Satellite Picture Processor," *Wireless World*, 1980, vol. 86, No. 1533, 6 pages in length.

L. Abbott, "Transmission of Four Simultaneous Television Programs Via A Single Satellite Channel," *SMPTE Journal*, Feb. 1979, vol. 88, pp. 106–111.

Lenny Lipton, "Foundations of the Stereoscopic Cinema", Van Nostrand Reinhold Co. 1983, pp. 262–263.

*Primary Examiner*—Howard W. Britton
*Attorney, Agent, or Firm*—Limbach & Limbach

[57] ABSTRACT

A method and apparatus for time multiplexing and demultiplexing two channels of picture information within a standard video channel. The method is specifically designed for field sequential stereoscopic display applications, but may be used for non-stereoscopic applications where conservation of bandwidth is required. The technique is superior to prior art commercially available stereoplexing approaches, and increases vertical resolution while decreasing stair-stepping of diagonal lines. The demultiplexing display controller of the invention can be manufactured at a low cost because its design takes advantage of commercially available integrated circuits.

16 Claims, 26 Drawing Sheets

| | OUTPUTS | |
|---|---|---|
| | L | R |
| INCOMING SYNC | BLACK | BLACK |
| VIDEO | INPUT | BLACK |
| ADDED DELAY SYNC | BLACK | BLACK |
| VIDEO | BLACK | INPUT |

CAMERA CONTROLLER FOR STEREOSCOPIC VIDEO SYSTEM

This application is a continuation in part of the assignee's application Ser. No. 07/751,883, filed Aug. 28, 1991, now U.S. Pat. No. 5,193,000.

FIELD OF THE INVENTION

The invention is a method and apparatus for multiplexing signals representing left and right perspective viewpoints within the existing video bandwidth to form a stereoscopic video signal. The stereoscopic video signal can be processed to produce a flickerless, field-sequential electronic stereoscopic display with good image quality. The multiplexing technique of the invention can also be used for non-stereoscopic ("planar") applications in which two distinct video programs are encoded within an existing bandwidth.

BACKGROUND OF THE INVENTION

Prior art field-sequential electronic stereoscopic video or television displays have suffered from a number of shortcomings, principally relating to high cost of manufacture and compromises in image quality. Typically, flickerless electronic stereoscopic video displays have been priced at tens of thousands of dollars. Given the approach in which the left and right images share a single channel, the resultant stereoscopic image has noticeably poorer image quality than that of one planar video image which solely inhabits the channel. Other field-sequential electronic stereoscopic video or television systems, which have a low user price, have made a serious performance compromise since they have a flickering display. While it is true that such products are attractively priced, they are not suitable for professional applications, and will have limited acceptance as an entertainment medium despite their novelty because of the obtrusive flicker.

In order for a field-sequential stereoscopic video display to be flickerless, each eye must see approximately the same number of fields in a unit of time as both eyes see in a non-stereoscopic ("planar") display. This requires a doubling of the vertical frequency, or the refresh rate. In the United States, and other NTSC countries, in which the refresh rate is approximately 60 fields/second for a standard planar video system, it is convenient to make a stereoscopic display which refreshes at 120 fields/second, rather than say, 110 or 140 fields/second, or some other arbitrary number. In this case, when using the proper selection device, each eye will see 60 fields/second. In PAL systems, which employ a standard refresh rate of 50 image fields/second, a rate of 100 fields/second is required for a flickerless stereoscopic display.

StereoGraphics Corporation produced the original flickerless electro-stereoscopic product which was first shipped in 1983, covered by U.S. Pat. No. 4,523,226, in which a form of image compression is used so that both left and right views share the existing video bandwidth. In this case the two images are squeezed by a factor of two in the vertical direction, as shown FIG. 8 of the present application. The resultant above-and-below sub-fields, 802 and 803, are located adjacent to each other within a single video field 801, and separated by a sub-field blanking interval, 804. These sub-field images are expanded in the vertical direction upon playback and displayed at twice the field frequency. In some applications, a scan converter, or line doubler, made by JVC or Sony, has been used to double the number of lines displayed to produce a smoother appearing raster. However, this approach exacerbated the stairstepping or jaggies artifact of diagonal lines. The above-and-below sub-field technique, in the first generation of manufacture, involved a modification to cameras to allow them to function at 120 fields/second, as described in Lipton et al's U.S. Pat. No. 4,583,117.

In the second generation, a digital device, manufactured for StereoGraphics Corp. by Fortel, was used to create the vertically compressed above-and-below sub-field format, and to restore this format to a field sequential 120/fields/second display. This allowed off-the-shelf, unmodified cameras to be employed, making the system more versatile and allowing the user to select from amongst a variety of video cameras. However, the analog to digital to analog compression/decompression device was costly to manufacture, and the technique intrinsically produced artifacts, such as the aforementioned stairstepping for diagonal lines and a reduction in vertical resolution. These artifacts were visually unpleasant.

Nevertheless, the second generation product had these virtues: it worked, was recordable with standard equipment, and produced a fair quality stereoscopic image, and it was the only thing of its kind one could purchase. But the systems' image quality was not as good as a comparable planar image, especially when viewed on large screens.

Interestingly, the technique of U.S. Pat. No. 4,523,226 has become the standard approach used by most graphics computers and graphics boards manufacturers who make 120 field/second stereo-ready products. In these applications, the technique works nicely because of the greater bandwidth available in computer systems, with their greater number of lines per field, compared with video displays.

An alternative technique, which is described in U.S. Pat. No. 4,562,463, to Lipton, produces a flickerless effect for a stereoscopic image, but does so by doubling the number of fields at playback. It does not use image compression; rather the camera set-up uses a video switch to switch between the perspective viewpoints at field rate. Upon playback the fields are stored in memory and read back at twice the rate at which they were stored. If played back in the proper sequence, the result is a flickerless field-sequential stereoscopic image. In the case of Lipton et al., U.S. Pat. No. 4,523,226, the multiplexing approach is based on a compromise in terms of spatial sampling in the vertical direction, leading to a reduction in vertical resolution, with the attendant artifact of stairstepping. On the other hand, in Lipton, U.S. Pat. No. 4,562,463, a compromise has been made in sampling in the temporal domain, which may produces image jitter, and possibly spurious temporal parallax, as described in Lipton, "Foundations of the Stereoscopic Cinema (Van Nostrand, 1983).

Other field-sequential, flickerless stereoscopic systems have been demonstrated, usually at trade shows. Philips and others have shown dual bandwidth systems using interlocked laser disc players supplying left and right images to two video projectors. The polarized light method of image selection is used in such a set up.

Ikegami has shown a dual bandwidth system, based on the NTSC protocol, in which signals from two NTSC cameras are combined in a storage device and then read out at twice the rate at which they were stored. The result is a signal with twice the normal bandwidth. This device was shown the conventions of the National Association of Broadcasters and the Society of Motion Picture and Television Engineers in 1990, with a price quoted at $150,000 and an unspecified delivery date. A similar approach was employed by NHK and described in the *SMPTE Journal*, February, 1990, in an article by Isono and Yasuda, entitled "Flicker-Free Field-Sequential Stereoscopic TV System and Measurement of Human Depth Perception." In the case of the last two systems described above, no attempt was made to produce a multiplexed signal which could be transmitted over existing NTSC transmission lines or which could be used with a single NTSC recording medium such as a video tape or disc player.

Other flickerless field-sequential plano-stereoscopic systems requiring individual selection devices have been demonstrated, but with the exception of the StereoGraphics product, none have been compatible with established video protocols.

In order for a field-sequential, flickerless stereoscopic video system to be successful for industrial, scientific, education, and entertainment uses, it must be compatible with the existing protocol and hardware infrastructure vis-a-vis cameras, transmission, recording, playback, and post-production. For example, it must operate with a single recorder rather with two electronically interlocked machines, as is the case for the Ikegami system mentioned above. Moreover it must not be priced a great deal more than a planar video system used for the same application. For example, if a teleoperations system is used in an underwater remotely operated vehicle, and a typical video system is priced at $15,000, it is unlikely that users will spend $150,000 or even $40,000 for a substitute stereoscopic video system, whatever its performance.

There is a distinction that must be made between upwardly and downwardly compatible stereoscopic video systems which involves multiplexing techniques, discussed in "Compatibility of Stereoscopic Video Systems with Broadcast Television Standards," by Lipton in SPIE, Vol. 1083, 1989. In the systems described in cited U.S. Pat. Nos. 4,523,226 and 4,562,463, no attempt was made to produce a downwardly compatible product. These systems are not downwardly compatible in the sense that their transmitted or recorded signals, when played back on a conventional monitor, will result in images appearing to be compressed or scrambled. An example of a downwardly compatible approach is the NTSC colorplexing protocol in which color information is added to the existing black-and-white transmission allowing black-and-white sets to receive a color signal which can produce an image of unimpaired quality. NTSC color information is transparent to monochrome sets, but to a color set the information produces a color image.

Suggestions for downwardly compatible stereoscopic video systems have been made by several workers, including Yoshimura in U.S. Pat. No. 4,772,944, and Yamada in U.S. Pat. No. 4,743,965. However, a study of these multiplexing techniques reveals that, while possibly downwardly compatible vis-a-vis existing receivers or transmission systems, they would not result in signals which could be recorded or played back on most conventional video tape recorders or laser disc players. The additional information required for the reconstruction of the complete stereoscopic image might be beyond the capability of professional high bandwidth recorders.

It would be necessary to produce a new type of video tape recorder to take into account the stereoplexed information. This would impose an enormous burden on consumers because tens of millions of video tape recorders are in their hands. The concept of compatibility, in this the age of the consumer video tape recorder, takes on additional complications that did not exist at the time of the introduction of the downwardly compatible colorplexed video protocols now employed throughout the world. As a matter of fact, the video tape recorders which have been introduced subsequently have had to take into account the additional color information and make special provision for its recording.

Today, the compatibility requirements are more severe than in prior years, and it may well be technically impossible to create a stereoscopic multiplexing technique which is compatible with the entire video infrastructure, which incorporates stereoscopic information which is transparent to existing receivers.

We expect that the upwardly compatible invention of the present disclosure will meet the requirements of the marketplace by producing a multiplexed video signal which can be displayed as a stereoscopic image of high quality, and which can be recorded and played back on existing professional and consumer video recorders and laser disc devices. The multiplexed video signal of the invention may be distributed by existing transmission schemes including satellite broadcast, through-the-air broadcast, and cable distribution.

Despite the fact that the multiplexed signal of the invention appears as a compressed or scrambled image when displayed on a non-stereoscopic ("planar") monitor, it may still be viable as a consumer product. These days there are many more means for delivering a video signal than in the days when color television was introduced. Then only VHF broadcast channels were available. Now there is also UHF, cable, home video tape recorders (VTRs), and the possibility of satellite broadcast. With so many more channels or means of distribution of video programs, there is the distinct possibility that a portion of some of these means might be dedicated to stereoscopic video.

The issue of downward compatibility is of less importance in an industrial, scientific or military application than it is in a consumer application, but it is a matter that needs to be considered.

There are many applications for a stereoscopic video system in industry, science, medicine, education, and the military. These users may be willing to pay more than home users for such capability, but eight years of experience of marketing such products indicate that they are not willing to pay a lot more. These days closed circuit color television systems using solid state cameras and good quality monitors have reached a high level of performance and image quality, at a low price.

Therefore it is desirable to design a field-sequential stereoscopic television system whose signal can be sent over a transmission line with no more bandwidth than that allocated for a planar signal, and can be recorded on an unmodified video tape recorder, so that the recorded signal may be played back on a stereo-ready television set or monitor. The stereoscopic images must be more or less subjectively equivalent in image quality to a normal planar video display. That means that each of the two perspective views must have more or less the same image quality as a non-stereoplexed planar image.

This must be accomplished at a reasonable cost of manufacture and sale price.

Various multiplexing techniques have been employed to incorporate additional video information within a single channel. One such product, known as the Comband system, was announced in the 1980's by General Electric, and is still offered by the Comband Company. The Comband system embodies a multiplexing technique of the type described in U.S. Pat. No. 4,533,936, to Tiemann, et al. The system uses a complex scheme in which the luminance signal is filtered to two and a half megahertz, or approximately half that of the normal NTSC bandwidth. An additional channel is added to the signal, and it is also compressed. The product allows a doubling of the number of channels available in a cable system.

Yet another approach is one which is described by G. R. Kennedy in "Weather Satellite Picture Processor, "Wireless World, Vol. 86, 1980, No 1533, in which two channels are incorporated within a single video field. In this case the images are located side-by-side, but there is no compression, and the images maintain their usual aspect ratio. Apparently this approach was used for convenience to save bandwidth and also to allow for fax transmission in certain circumstances.

Compression in the time domain has been used. One example of this is described in U.S. Pat. No. 4,027,333 to Kaiser et al., in which alternate fields are encoded with alternate images. The images are then separated on an alternate field basis, and interpolation is used to synthesis missing field information. This device was developed at C.B.S. Labs and then by Thompson CSF. It was also part of a system discussed by Liston Abbott in an article in the February, 1979 SMPTE Journal, Volume 88, entitled "Transmission of Four Simultaneous Television Programs Via A Single Channel." Multiplexing in the time domain may be the most costly approach.

SUMMARY OF THE INVENTION

The invention is a method and apparatus for multiplexing and demultiplexing two channels of picture information within a standard video channel. The method is specifically designed for field sequential stereoscopic display applications, but may be used for nonstereoscopic applications where conservation of bandwidth is required. Embodiments of the invention are compatible with a variety of conventional video protocols, including the commonly employed NTSC and PAL broadcast standards, and any newly introduced so-called high definition TV standard. Computer graphics images may also be stereoplexed by using the inventive technique.

The inventive system can also produce a two projector stereoscopic display, or two channels of independent non-stereoscopic (planar) displays.

The present disclosure, while teaching the techniques of the overall system, teaches display (or playback) aspects of the invention in particular detail. The cost of manufacturing the inventive hardware (for implementing the inventive technique) is lower than the cost of manufacturing prior art devices, in part because the inventive design takes advantage of commercially available integrated circuits. Moreover the invention can achieve image quality superior to that which can be achieved using prior commercially available stereoplexing hardware because the invention results in improved vertical resolution and does not exacerbate the stairstepping of diagonal lines.

When displayed on a conventional non-stereoscopic monitor, the stereoscopic video signal of the invention results in image pairs that are digitally squeezed and located side-by-side within the usual field area. The signal can be digitally processed to unsqueeze and demultiplex the images to restore them to an analog field sequential format suitable for display on commonly available stereo-ready computer graphics monitors.

The invention is video protocol independent, but specific embodiments described herein can be used with conventional recording, playback, and display hardware that implements the NTSC (or PAL) protocol.

BRIEF DESCRIPTION OF THE DRAWINGS

FIG. 9A represents a horizontal line of an input video signal multiplexed in accordance with the invention. The left half of the signal is a 2:1 time compressed signal from camera A. The right half of the signal is a 2:1 time compressed signal from camera B.

DESCRIPTION OF THE PREFERRED EMBODIMENT

Figure 1A:
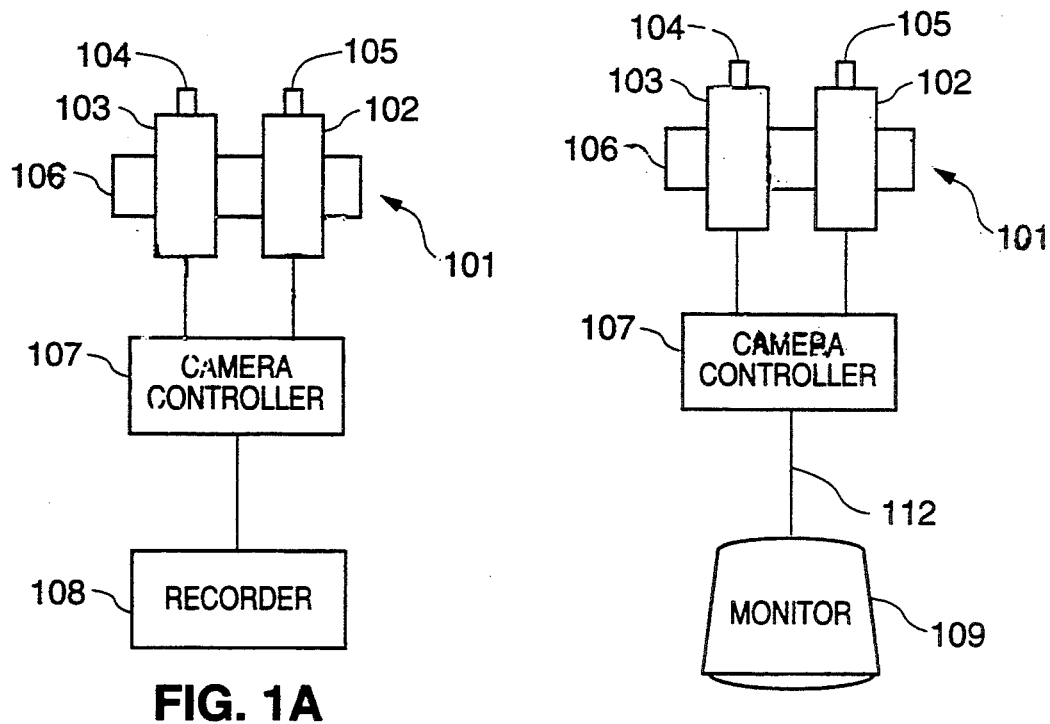
FIG. 1A is a block diagram of a stereoscopic video camera, with left and right heads mounted on a base, and a camera controller for multiplexing the output of the left and right heads. The multiplexed output of the controller can be recorded by a normal bandwidth recorder.

FIG. 1A shows a basic layout of an electronic stereoscopic camera system which embodies the invention. Electronic camera 101 of FIG. 1A is made up of two video cameras (or "heads") 102 and 103, having lenses 105 and 104, respectively, each of which is used to capture its perspective point of view. Heads 102 and 103 are mounted on a base 106, and can be standard unmodified PAL or NTSC protocol video cameras. For the some of the discussion below, for didactic purposes, and without loss of generality, the invention will be discussed in the context of the NTSC system. The signals from cameras 102 and 103 are fed to camera controller 107.

A detailed description of how the two signals are processed within controller 107 will be provided below. In general, the two signals are stored in memory and operated on topologically to produce a multiplexed signal which would have the appearance shown in FIG. 2 if displayed on a conventional planar monitor. The multiplexed signal asserted by controller 107 can be recorded and played back on standard recorder 108. When the signal from recorder 108 is played back through the display controller 302 of FIG. 3, it is at twice the usual vertical frequency (i.e., twice the usual NTSC vertical frequency). The played back signal is expanded and demultiplexed to put it into the field sequential format diagrammatically depicted in FIG. 6A.

Figure 1B:
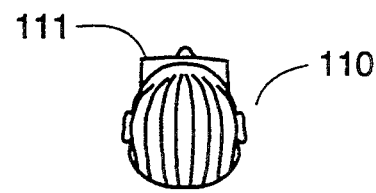
FIG. 1B is a block diagram similar to FIG. 1A, which shows the camera controller feeding a monitor directly, rather than a recorder. The left and right channels can be compressed to the bandwidth of a single planar channel, or the fields can be formatted for alternate field stereoscopic display without bandwidth compression.
Figure 1C:
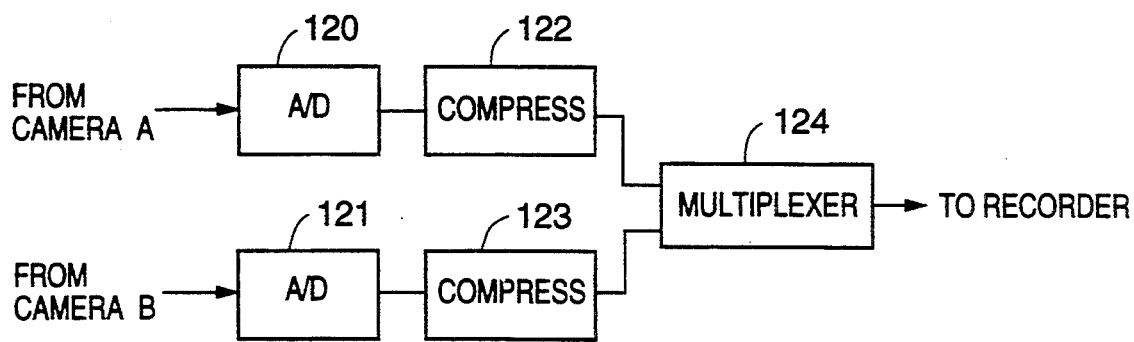
FIG. 1C is a simplified block diagram representing the camera controller of FIG. 1A.

FIG. 1C is a simplified block diagram representing camera controller 107 of FIG. 1A. Analog video signals from camera 102 (identified as camera A in FIG. 1C) and camera 103 (identified as camera B in FIG. 1C) are digitized in analog-to-digital converters 120 and 121, respectively. Compression means 122 horizontally compresses each line of the digital output of circuit 120, and compression means 123 horizontally compresses each line of the digital output of circuit 121. Time-division-multiplexing means 124 time-division-multiplexes the output signals asserted by circuits 122 and 123. The data stream asserted at the output of multiplexing means 124 represents video lines having the format shown in FIG. 9B. Thus, the output data stream asserted by means 124 comprises one or more lines, each of which lines has a first portion representing a compressed line of the output of camera A, and a second portion representing a compressed line of the output of camera B (the second portion is concatenated with the first portion).

In FIG. 1B, camera controller 107 outputs a live signal for display (rather than a signal to be recorded) to a stereo-ready monitor 109, which is viewed by observer 110 using selection device 111.

To take full advantage of the case that communication link 112 (which can be a transmission line) can transmit a signal of twice the usual video bandwidth, camera controller 107 (in the FIG. 1B embodiment) is preferably designed to operate in a mode in which it outputs a signal having twice the usual video bandwidth. In this mode, the signals from camera heads 102 and 103 are stored in controller 107, and are read out (from memory within controller 107) alternately at twice the speed or rate at which they were written into the memory. In this case (unlike in the FIG. 1A embodiment in which the signal asserted at the output of controller 107 has the usual bandwidth), the signal output from controller 107 has no bandwidth compression (unlike the displayed signal shown in FIG. 2), and the controller 107 outputs twice as much information as in the FIG. 1A embodiment (since there is no compression of information along a horizontal line).

Figure 1D:
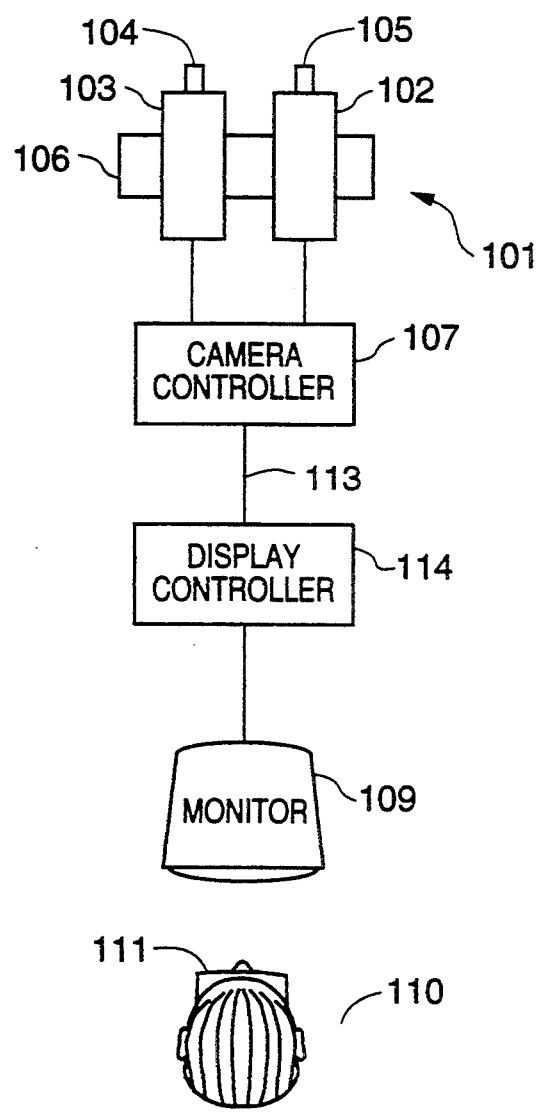
FIG. 1D is a block diagram of a live video communications link using the cameras and controllers shown in FIGS. 1A and 1B.

With reference to FIG. 1D, for operation with a live video link 113 of a type incapable of transmitting signals of more than the usual video bandwidth, controller 107 should be capable of operating in a mode in which it transmits a signal having the usual video bandwidth (as does controller 107 in FIG. 1A). In this mode, the output of controller 107 includes less information than the combined output of cameras 102 and 103 (i.e., when displayed on a conventional monitor, each field of the output of controller 107 would have the appearance of two side-by side images as in FIG. 2, but each of these two images would have only about half the information of a conventional field). In both this mode and the mode described in the previous paragraph, however, the video ultimately displayed has twice the normal horizontal frequency (for example, in an NTSC compatible version, about 31.5 KHz, instead of the usual planar NTSC horizontal frequency of about 15.7 KHz).

Figure 2:
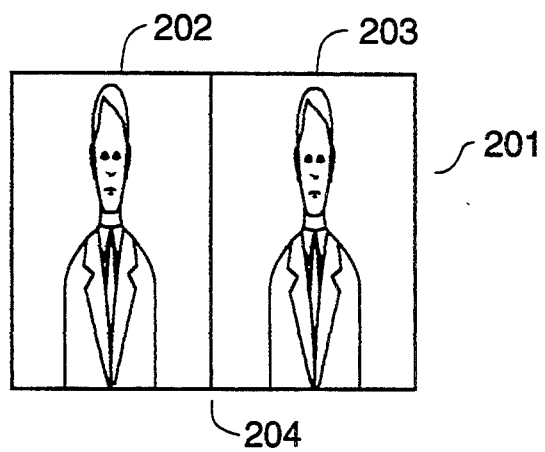
FIG. 2 shows vertically compressed sidefields of the multiplexed video signal of the invention as they would be seen if the signal was played back on an unmodified non-stereo-ready monitor.
Figure 3:
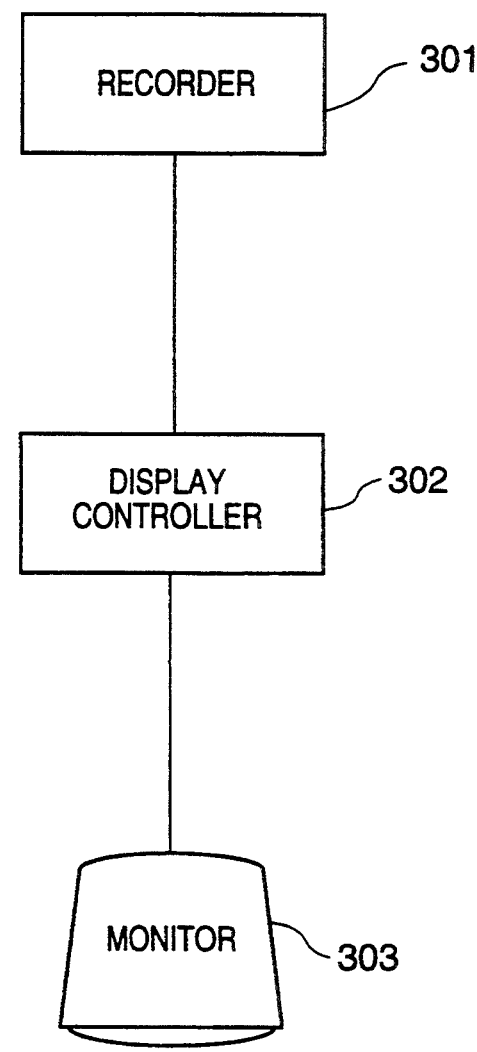
FIG. 3 is a block diagram of a standard video tape recorder feeding a stereoplexed signal to a display controller which in turn feeds a stereoscopically formatted signal to a stereo-ready monitor.
Figure 3:
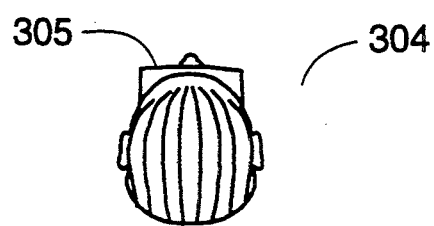

In FIG. 3, display controller 302 receives multiplexed video signals (for example, signals encoded with topologically transformed and multiplexed images of the type depicted in FIG. 2) that are played back from standard video recorder 301. Controller 302 demultiplexes the played back signals for display on monitor 303, for viewing by a user 304 equipped with selection device 305.

Display controller 302 is capable of demultiplexing video signals produced by the camera controller 107. Thus, the signals displayed on monitor 303 will have reduced information along a horizontal line, although the video presented to monitor 303 has a horizontal frequency (for NTSC) of 31.5 KHz, rather than the usual planar 15.7 KHz. As will be described below with reference to FIG. 2, the display controller produces field sequential video at twice the vertical frequency from the camera controller signal.

If the bandwidth of the signal played back by recorder 301 is kept to that of the usual video protocol (i.e., NTSC) and not expanded, the system maintains signal compatibility with the conventional video or television infrastructure. The means by which this is accomplished using controller 302 is the subject matter of a preferred embodiment of the invention.

In accordance with the invention, left and right fields outputted by two video cameras (which comprise a stereoscopic video camera) are squeezed (compressed) by a factor of two, in the horizontal direction. We shall call the squeezed or compressed images "sidefields." The compressed fields (sidefields 202 and 203 shown in FIG. 2) are located side-by-side within a conventional field area (201 in FIG. 2). Boundary 204 between the sidefields (shown in FIG. 2) is not devoted to horizontal blanking, since this would reduce the resolution along a line. If such topologically transformed multiplexed images are played back on a conventional planar monitor, they will appear to be side-by-side and squeezed in the horizontal direction by a factor of two (as shown in FIG. 2).

Figure 6A:
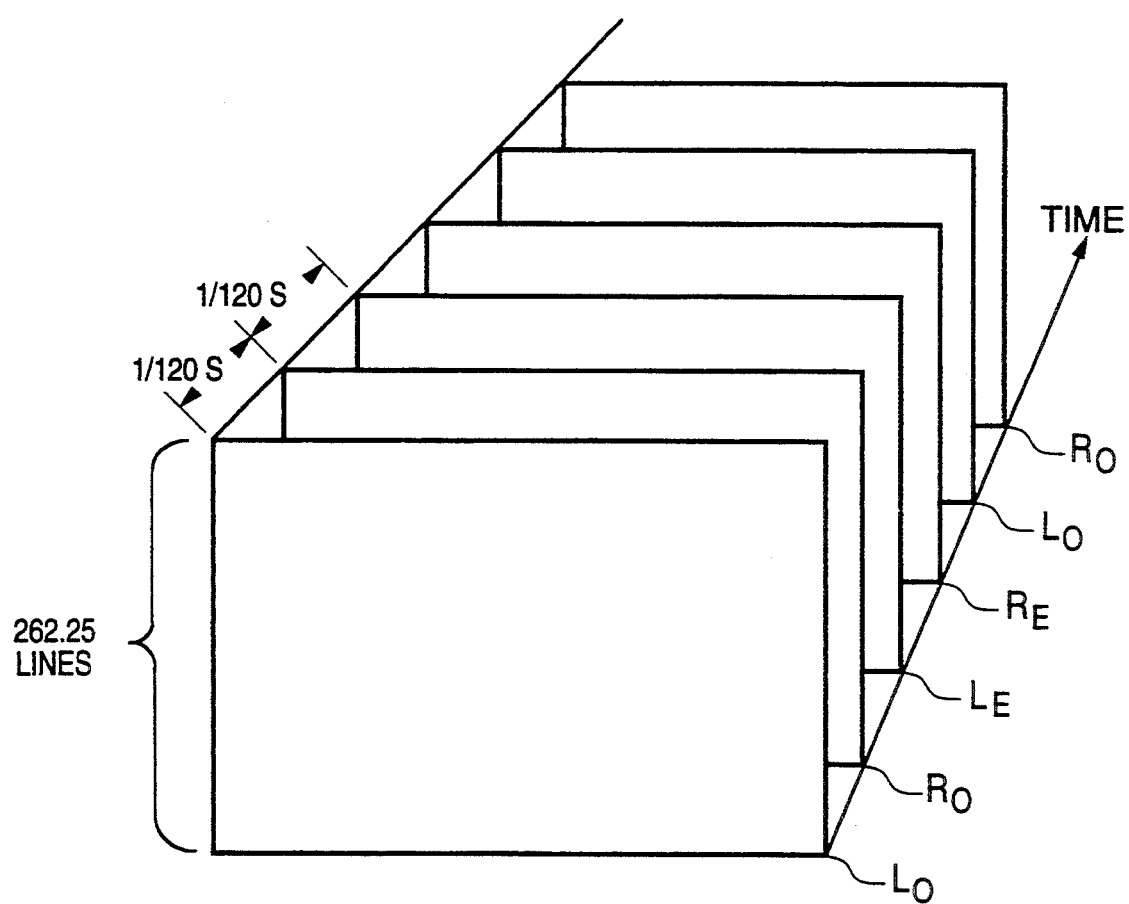
FIG. 6A is a diagram representing a stereoscopic video signal format compatible with the NTSC protocol, with a 4-fold interlace with 262.25 lines/field, and a rate of 120 fields/second.

If a controller is used to unsqueeze (expand) and demultiplex the signal before it is displayed on a monitor, the controller can organize the signal to produce a sequence of fields suitable for the display of a stereoscopic video image. In such a case the fields will have been expanded to normal proportion or aspect ratio, and the left sidefields and right sidefields rather than being juxtaposed spatially, will now be juxtaposed temporally and repeated in sequence. This sequence is as follows: left odd, right odd, left even, right even ... ad infinitum, as will be discussed more fully later in this specification (and as illustrated diagrammatically in FIG. 6A with specific reference to the NTSC protocol). In FIG. 6A, the left odd, right odd, left even, right even fields are labeled $L_O$, $R_O$, $L_E$, $R_E$, respectively.

Persons of ordinary skill in the art will understand that the technique described herein will work with other video protocols such as the European PAL system, that the terms odd and even refer to the interlace characteristics of the video image, and that the terms left and right refer to the perspective viewpoints photographed by the video cameras. A four-fold interlace is employed, as was employed in the implementation in above-referenced U.S. Pat. No. 4,523,226, and described in the "A Time-Multiplexed Two-Times Vertical Frequency Stereoscopic Video System", by Lipton and Meyer, SID 84 Digest. There are alternatives to a four-fold interlace, as is described in granted U.S. patent application Ser. No. 07/595,595, such as a dual two-fold interlace. Although the four-fold interlace approach is described in detail, the invention is not limited to this approach and may be implemented with other types of interlace, or with non-interlace or progressive scan.

Persons of ordinary skill in the art will have no difficulty in understanding how the method described in the present specification can be applied to non-interlaced or progressively scanned video or computer graphics images. However, the NTSC and PAL video protocols which are of greatest concern from a commercial point of view, use the interlace mode.

Figure 4:
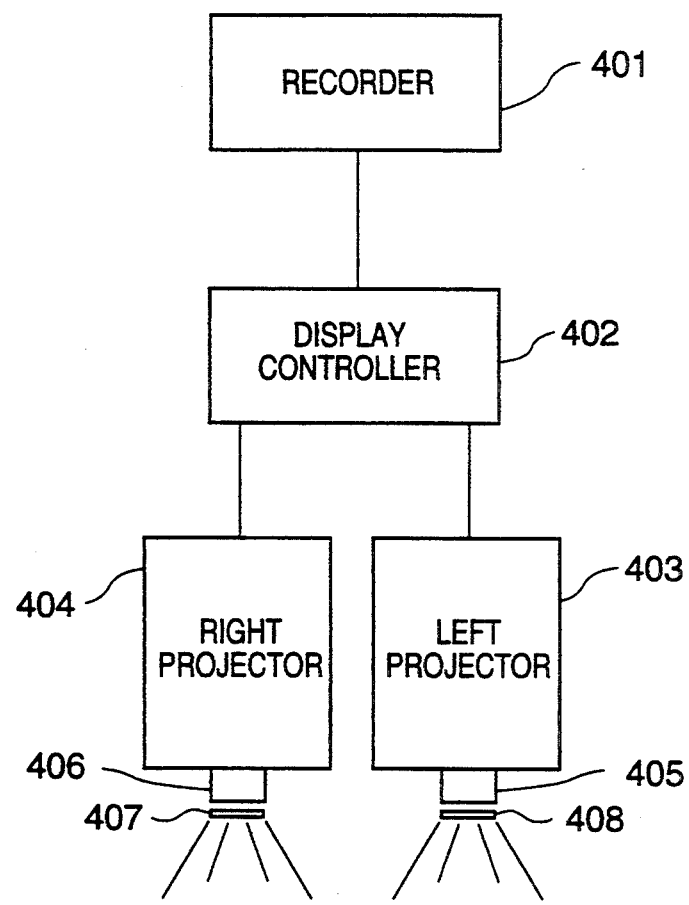
FIG. 4 is a block diagram of a standard video tape recorder feeding a signal to a display controller which in turn provides independent left and right signals at the usual refresh rate. The left and right signals are fed to left and right video projectors for projection of stereoscopic images using the polarized light method of image selection.
Figure 4:
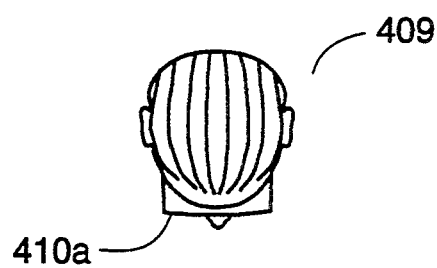
Figure 4:

In the FIG. 4 embodiment, an alternative embodiment to the time-sequential scheme given above, two separate, parallel, output video channels are produced, one for a left projector and the other for a right projector. Display controller 402 receives a signal (a signal multiplexed in accordance with the invention) from recorder 401, and processes the signal to produce two parallel channels of left and right picture information. This outputting of two standard video channels allows the use of two video projectors 403 and 404, with lenses 405 and 406, for projection of images with the polarized light method of image selection. Polarizing filters 408 and 407 impose different polarization characteristics on the light projected from projectors 403 and 404 onto screen 410. The latter technique is well known in the motion picture industry and described in Lipton's "Foundations of the Stereoscopic Cinema" (Van Nostrand Reinhold, 1982). It is necessary to use a screen 410 which has a metallic surface which may conserve polarization, so that a proper stereoscopic image may be seen by the observer 409 who is wearing polarizing spectacle selection device 410a.

Figure 5:
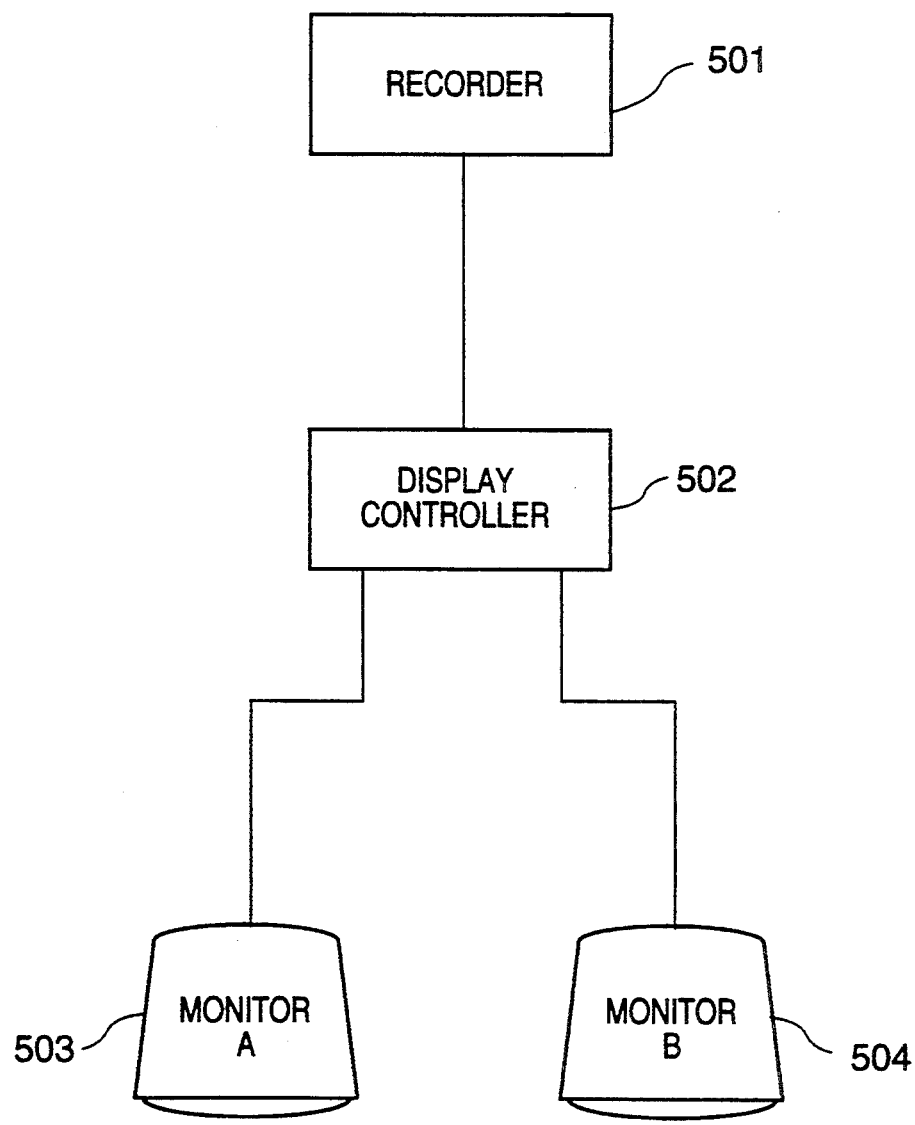
FIG. 5 is a block diagram of a standard video recorder feeding a signal to a display controller which in turn provides independent channels A and B for display of two programs on individual monitors.

A different application for the inventive technique of simultaneous rather than the sequential presentation of two channels will next be described with reference to FIG. 5. The technique is the encoding of two independent planar channels on a single tape, or the playback and transmission of such multiplexed signal over a single transmission line. The technique can double the number of programs available within a given channel, or allow for user selection between two channels in an interactive mode. As shown in FIG. 5, recorder 501 provides a multiplexed signal (of the type described above in this paragraph) to display controller 502. Controller 502 demultiplexes the two images (image A and image B), for separate display on standard planar monitors 503 and 504 (with monitor 503 displaying image A and monitor 504 displaying image B).

In stereoscopic applications, the camera controller of the invention (i.e., controller 107 of FIG. 1A, 1B, or 1D) receives signals from left and right cameras (or camera heads), and is capable of generating an output signal compatible with a conventional video protocol by multiplexing the two input signals. This allows recording or transmission of the multiplexed signal with existing hardware. The camera controller (multiplexer) produces images ("sidefields") which are squeezed (compressed) horizontally and placed side-by-side to conform to the requirements of a video field of a given protocol. FIG. 2 shows a pair of such sidefields.

Figure 6B:
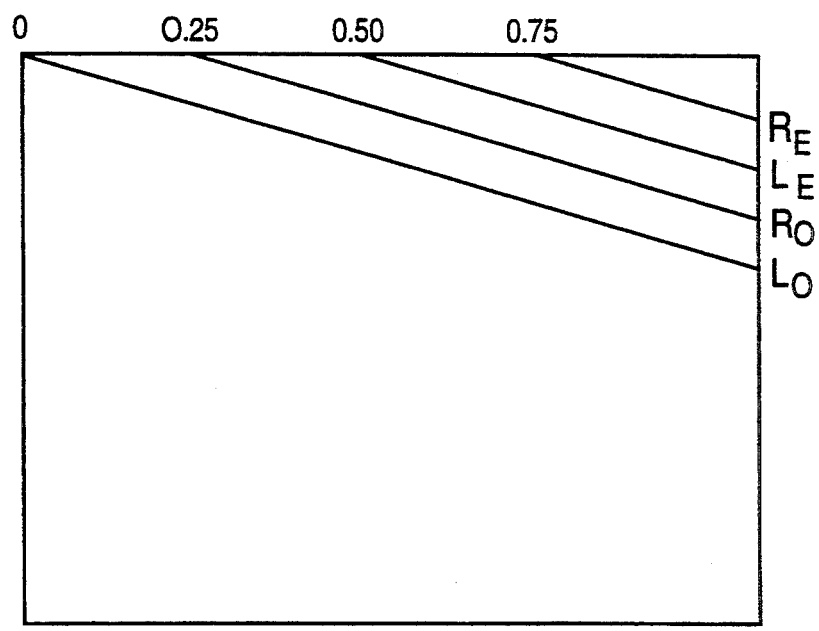
FIG. 6B represents the 4-fold interlace scheme employed in the FIG. 6A format.

The playback controller of the invention (i.e., controller 302 of FIG. 3) operates on the stereoplexed signal to read out the sidefield lines in the sequence described above. If the stereoplexed signal has NTSC format, the first set of lines to be displayed are 262.25 lines of, let us say, the first left field. Then the adjacent right field is read out, and subsequently the process continues, ad infinitum, for additional fields, as shown in FIG. 6A. Each field is 120th of a second, and the sequence of fields in the time domain is described above, and shown in FIG. 6A. The first and last line of each field must begin (and end) at one of the "0," "0.25," "0.50," or "0.75" positions of a conventional horizontal line, in order to create the necessary 4-fold interlace, as shown in FIG. 6B.

Each eye of a viewer, when looking though a selection device sees only its right or left lines, and successive fields for each eye form a 2-fold interlace. This interlace pattern conforms to the format presently employed in the display of planar video images.

Horizontal sync pulses between the sidefields must be omitted from the signal asserted at the output of the inventive camera controller, because video tape recorders must see sync pulses only at the end of a line. Thus, we omit the horizontal sync blanking area and pulses between sidefields, as mentioned above and shown in FIG. 2. Therefore, the sync pulses separating the sidefields are added by the playback controller to conform to the desired video protocol and to enable the monitor to lock to the lines of the field. We also omit any sidefield horizontal blanking area in order to increase the image resolution.

By way of reference, the NTSC protocol consists of 525 lines at a line rate of 15.75 KHz, made up of approximately sixty 2-fold interlaced fields/second or 30 frames/second. A stereovideo signal based on this protocol outputted by the inventive playback or display controller is made up of 120 fields/second with a line rate of 31.5 KHz with 262.25 lines/field to produce a 4-fold interlace, as illustrated in FIGS. 6A and 6B. The result then is a sequence of stereoscopic fields of 262.25 lines in a 4-fold interlace in the following sequence: left odd, right odd, left even, right even . . .

Figure 7:
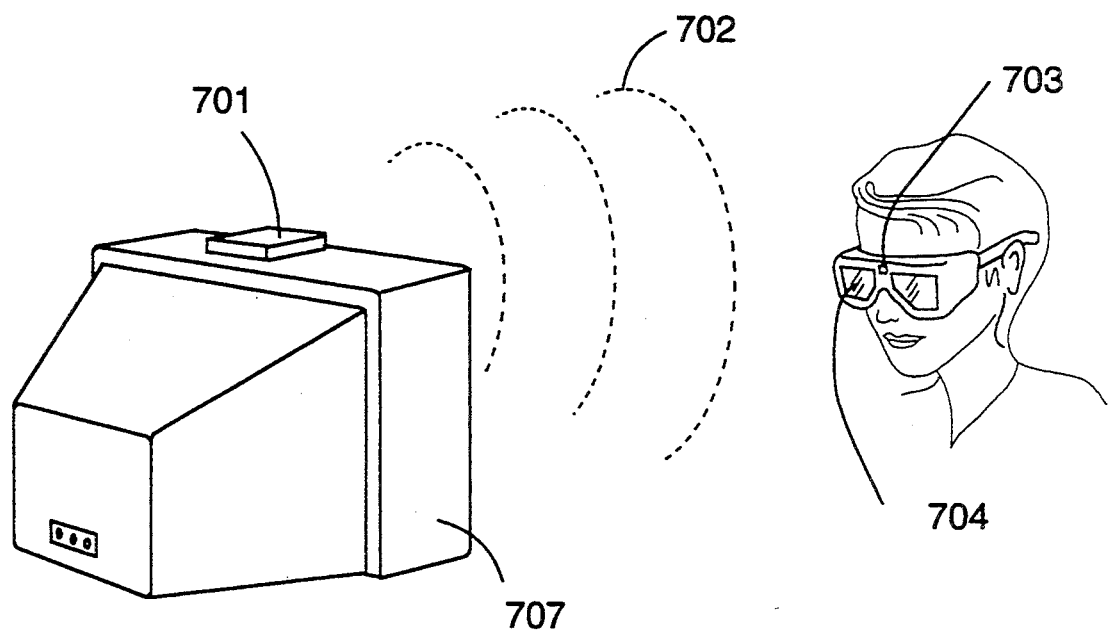
FIG. 7 is a perspective view of the conventional device known as the CrystalEyes selection device, which is used to view stereoscopic images.

When the images are viewed through an appropriate selection device, as described in U.S. Pat. Nos. 4,967,268 and 4,884,876 (Lipton, et al.), and illustrated in FIG. 7, the result is that each eye sees its and only its appropriate sequence of fields. The CrystalEyes$^R$ selection device 704 (shown in FIG. 7), described in these two patents and manufactured by StereoGraphics Corp., uses liquid crystal shutters which open and close in synchrony with the video field rate displayed on monitor 707, so that each eye sees alternate images. Synchrony is maintained between the video source and the eyewear by means of infrared emitter 701. The infrared signal is sensed by a sensor 703 mounted on the eyewear. This is one image selection technique that has been employed commercially, but others exist such as that described in U.S. Pat. No. 4,792,850 (Lipton, et al.) and also manufactured by StereoGraphics Corp. The present invention is independent of the particular selection technique employed, and will work with any properly engineered individual shuttering selection device.

When the demultiplexed signal of the invention is displayed, each of the viewer's eyes will see a 2-fold interlaced frame of approximately 480 visible lines. Each eye will see alternately an image field of the proper perspective followed by a blank interval of no image of the same duration as an image field, followed by an image field, and so on. The other eye is seeing the same sequence with the image fields and blank portions out of phase with the first eye. If the fields are properly prepared and presented, the eyes and the brain are able to synthesize a flickerless image with both motion and the depth sense stereopsis out of this succession of left and right fields, alternated by intervals with no image.

The multiplexing technique of the invention produces images which are, for the great majority of subjects videographed, all but indistinguishable from conventional NTSC images. That is to say, a planar NTSC image has a given quality, and both left and right images resultant from the inventive stereomultiplexing and demultiplexing technique will produce images which are more or less the equivalent of a conventional planar image. In comparison testing, rapidly shifting between two images, compressed and then uncompressed, versus the same image which had not been processed, for the great majority of images, it was virtually impossible to tell the difference between an original image, and a compressed and uncompressed version of the image. An expert observer had to be several inches from the display screen before relatively minor differences in edge sharpness could be seen.

In a comparison between the inventive side-by-side squeezing multiplexing technique, and the vertical compression technique described in above-referenced U.S. Pat. No. 4,523,226, the approach of the present invention produced a substantial improvement in quality. The prior vertical compression technique produced images which were degraded compared to the inventive horizontal compression technique.

The explanation for this result is that video scanning, or sampling, of an image is analog (i.e., more or less continuous) in the horizontal direction, but discrete in the vertical direction. Since the direction of scanning is horizontal, horizontally adjacent image points may have a continuum of information between them, whereas vertically displaced image points must exist in strictly quantized positions. It is not possible to record information between adjacent scanning lines, and while the ability to resolve detail along a horizontal scanning line is finite, in this direction the resolution capacity is very much greater.

We live in an age in which video images are described and analyzed in terms of picture elements or pixels. This is a practice which was adopted from the computer graphics industry and is appropriate in that field since the calculation of images is indeed based upon individual pixels. However, such an analysis falls short of the mark when applied to video, since video is an analog medium. This is understood and appreciated by video engineers who use modulation transfer techniques for image quality analysis.

The transmission or storage of detail along a horizontal line of a video signal is an analog function, and is best described in analog terms or according to modulation transfer function, bandwidth, or similar means of analysis. There is a great deal of information in a horizontal line, and it is not easily quantifiable into pixels. The horizontal compression technique of the invention takes advantage of this and is able to produce an image which, for most subjects, subjectively appears to be virtually as sharp, upon decompression, as a comparable conventional planar image which occupies the entire field.

The inventive camera controller can operate in another mode without image compression for "live" video as shown in FIG. 3. In this case it can accept two signals from the two video camera heads of a stereo camera rig and, in response, output the following sequence of image fields: left odd, right odd, left even, right even, and so on, without any loss of bandwidth or picture information. Instead of horizontally compressing each line or field, the controller (302) can operate in a mode in which it speeds up the display of each field to twice the rate at which it was scanned. In this way the bandwidth of each video camera head's output may be preserved. Such an approach is ideal for closed circuit television where it is not necessary to record the signal and where twice the bandwidth is available.

We next describe a preferred embodiment of the inventive display (and playback) controller. Those of ordinary skill in the art will appreciate that there are other circuits or architectures embodying the invention which could be substituted for the display controller described in detail below.

The playback controller can output a field sequential stereo signal from a horizontally compressed video signal. The playback controller performs this transformation on video signals which are compatible in all respects with NTSC or PAL except that the horizontal picture information is compressed by a factor of two, and is time multiplexed with information from two camera sources.

Figure 9B:
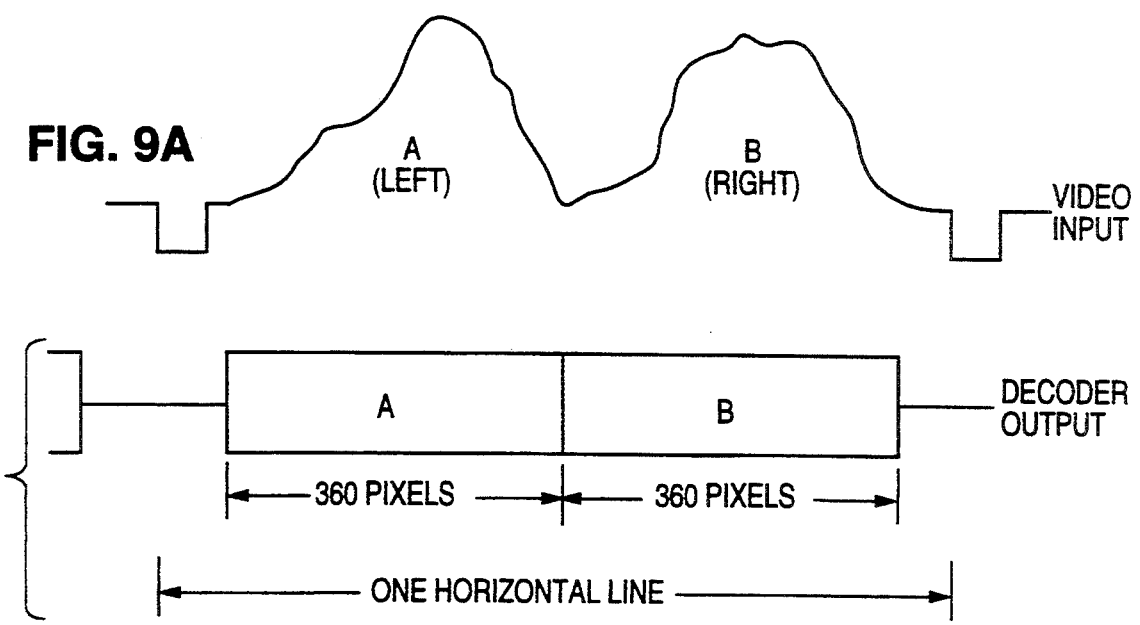
FIG. 9B represents the signal of FIG. 9A after digitization. The A and B signals are digitized into 360 pixels each. The horizontal sync interval is not used.

The horizontal video line shown in FIG. 9A represents the output of the inventive camera controller. As shown in FIG. 9A, the signal in the first half of the line is provided by the left camera, and the signal in the right half of the line is provided by the right camera. FIG. 9B represents the output of the decoder (i.e., decoder 7 in FIG. 10).

The video signal output from the controller is compatible with NTSC and PAL standards, including the number of lines per field and the method of modulating the chroma onto a subcarrier. In addition to standard composite signals, the unit accepts the SVHS Y/C format.

Figure 10:
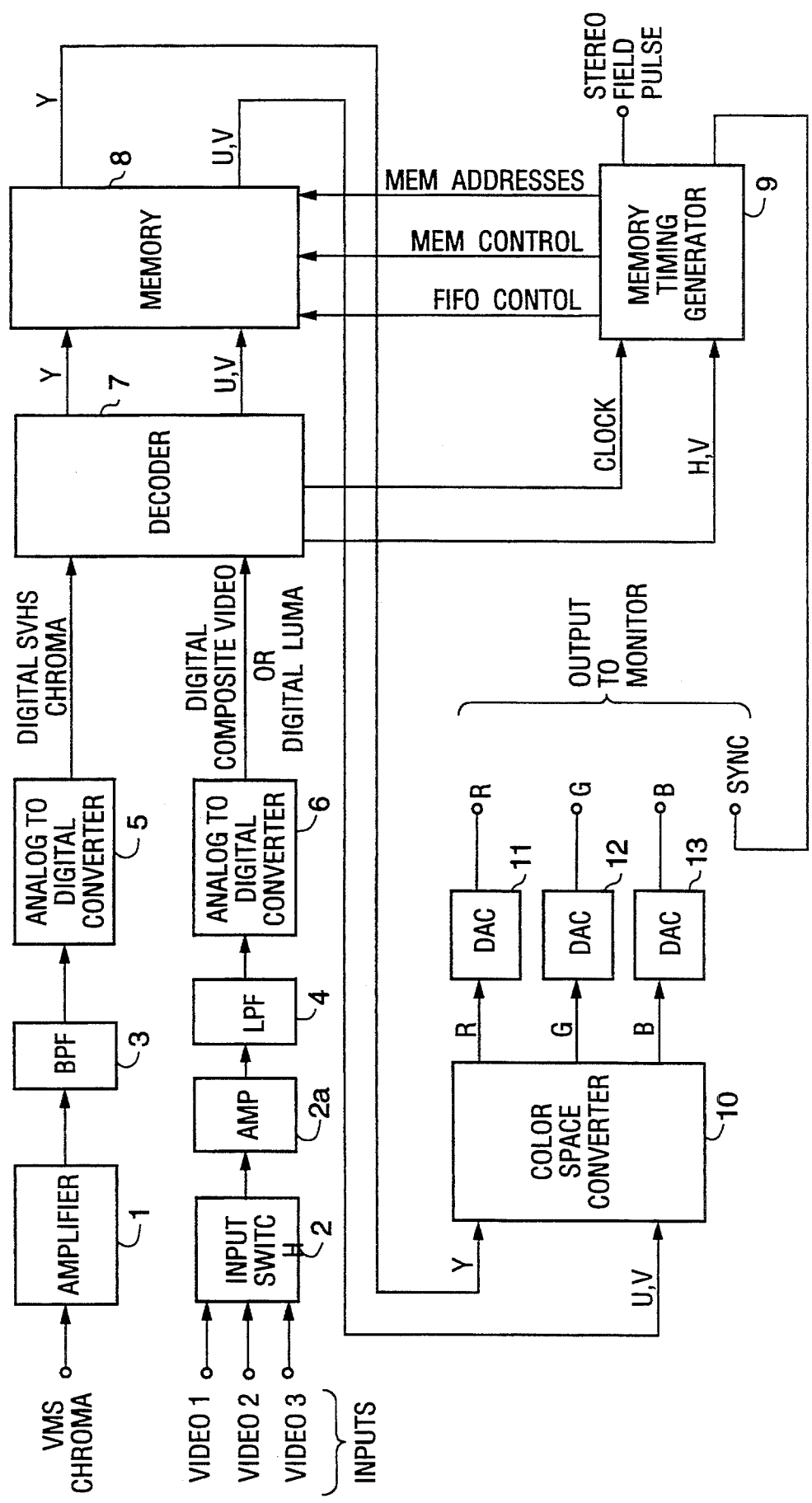
FIG. 10 is a block diagram of a preferred embodiment of the inventive playback controller, showing the major processing sections.

The display (and playback) controller shown in FIG. 10 accepts input signals from either composite or SVHS sources in NTSC or PAL formats. Composite sources are connected to the "Video 1" and "Video 2" inputs of input switch 2. For component video input formats, the luminance component is connected to the "Luma" input of switch 2, and the chroma component is connected to the "Chroma" input of chroma input amplifier 1.

After passing through input switch 2, the composite video or luma signal is buffered in buffer amplifier 2a, and low pass filtered in filter 4 to remove high frequency information which would cause aliasing artifacts. The resulting low pass filtered composite video (or luma) is then converted from an analog signal to a digital data stream in A/D converter 6. Similarly, after the chroma signal is buffered by chroma buffer amplifier 1, it is bandpass filtered in circuit 3 to remove unwanted frequencies. The filtered chroma output from circuit 3 is converted from an analog signal to a digital signal in A/D converter 5.

In a preferred implementation, composite input switch 2, amplifier 2a, and analog to digital converter 6 are contained within a Philips TDA8708 video analog input interface chip. Chroma input amplifier 1 and analog to digital converter 5 are contained within a Philips TDA8709 video analog input interface chip.

The resulting digital composite video or digital luma and chroma signals are presented to the digital decoder 7. In a preferred implementation, decoder 7 is a Philips chipset composed of one SAA7151 Digital multi-standard decoder and one SAA7157 clock signal generator circuit. Decoder (and phase locked loop) 7 is described in more detail below with reference to FIG. 11.

Decoder 7 includes three input video processing sections: a sync stripper and phase locked loop, a chroma demodulation means, and a luminance filtering means. The sync stripper separates the horizontal and vertical sync timing edges from the incoming video. Horizontal and vertical sync are buffered out of circuit 7 and are used later in memory timing generator 9 (to be described with reference to FIG. 14).

Figure 11:
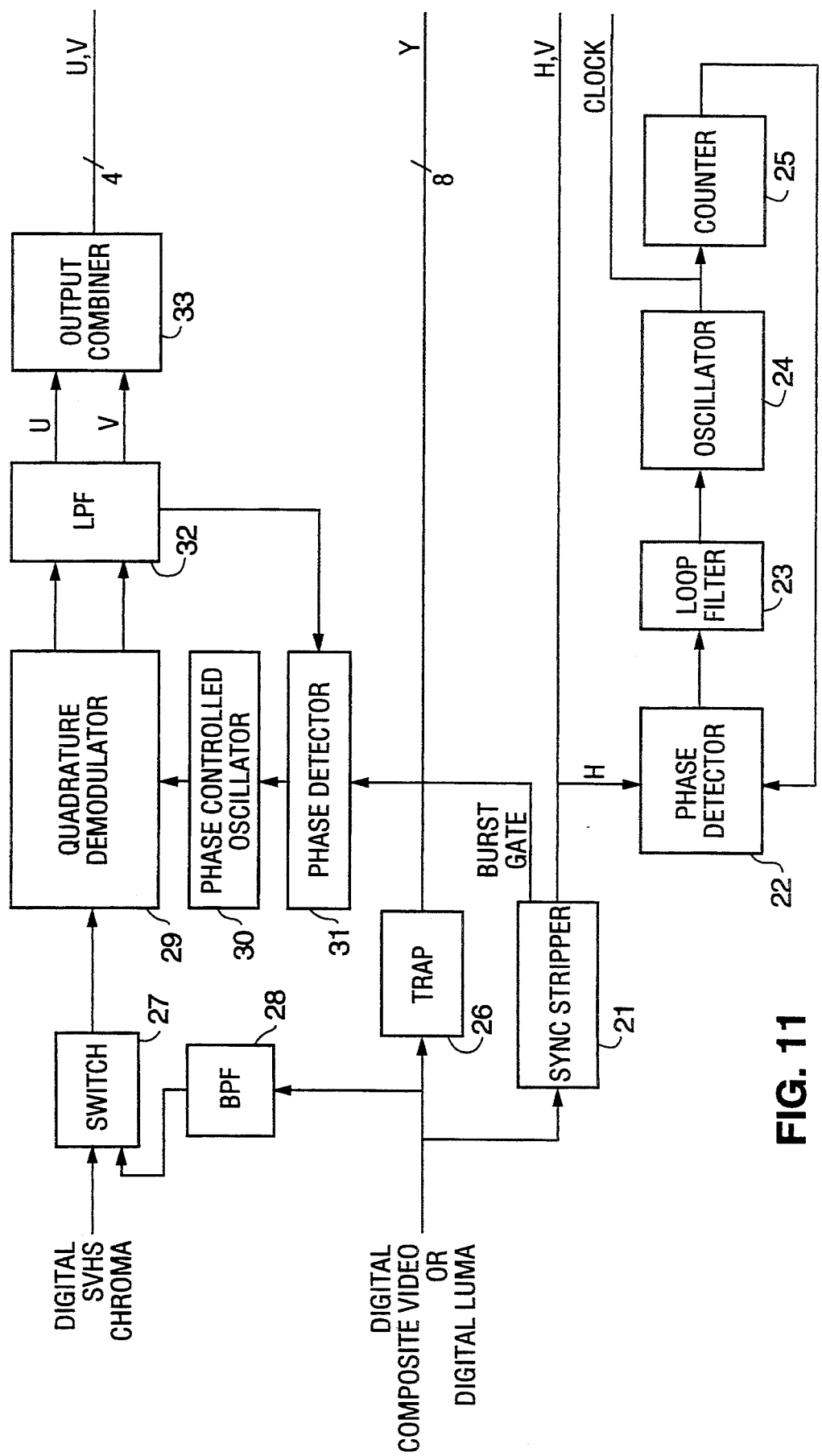
FIG. 11 is a detailed block diagram of the decoder of the controller of FIG. 10. The decoder transforms the composite or SVHS video into Y,U,V components and extracts timing information.

Horizontal sync timing is used within decoder 7 as a reference for a clock generator phase locked loop. This clock is used to run the memory and output circuitry and is available at 27 MHz and 13.5 MHz. A block diagram of the phase locked loop within decoder 7 is shown in FIG. 11. The loop includes phase detector 22 (which compares the reference input H to a divided down version of the oscillator clock), filter 23, oscillator 24, and counter 25. Counter 25 can be programmed to set the output clock frequency at 13.5 MHz when the input signal has NTSC or PAL timing. The result is that there are 858 clocks per horizontal line of information, 720 of which are considered to be the active video interval and stored in memory. Because the clock is locked to the input horizontal sync and it is used to derive the memory timing and output timing, the output signal and input signal are phase coherent and no time base correction is performed on the video.

The simplified luminance path within decoder 7 includes trap filter 26 (shown in FIG. 11), which removes the chroma component of the input video signal. A disadvantage of trap 26 is it reduces the high frequency information in the video. In the SVHS mode, trap 26 is disabled and the full luminance frequency resolution is preserved.

The chroma path within decoder 7 processes and demodulates the color component part of the video signal. Quadrature demodulator 29 receives chroma through switch 27 from either of two sources: directly from the SVHS digitizer (circuit 5 of FIG. 10) or through bandpass filter 28 from the encoded video signal. Switch 27 performs source selection. Demodulator 29 is of the quadrature type and decomposes the phase encoded chroma information into U and V components. Demodulator 29 receives zero and ninety degree subcarrier signals from a phase locked loop including phase detector 31, oscillator 30, and low pass filter 32. Phase detector 31 strives to maintain a constant zero degrees of phase between the oscillator output signal and the input chroma at burst time. Therefore, a burst gate is provided to circuit 31 by sync stripper 21.

After undergoing lowpass filtering in filter 32 to remove unwanted demodulation frequencies, the U and V eight-bit data are combined in circuit 33 into a four-bit 4:1:1 subsampled word. Therefore each 12 bit output word consists of eight bits of luminance from trap 26 and four bits of chroma from combiner 33. Because the chroma U and V are subsampled, four pixels of luma are required to transfer one pixel of color. This color subsampling is not objectionable to the viewer.

With reference again to FIG. 10, memory 8 receives compressed video information in horizontal sequential format (i.e., video information comprising lines having the format shown in FIG. 9B), and temporarily stores the compressed video information for later retrieval and output in field sequential form.

Each pixel stream for a single line (such as that shown in FIG. 9B) asserted at the output of decoder 7 consists of 360 pixels from camera A, followed by 360 pixels from camera B. An entire field output from decoder 7 consists of 240 lines (NTSC) or 287 lines (PAL). The video stream output to the monitor from the display (playback) controller of FIG. 10 has "field sequential" format, in the sense that it consists of alternating fields from camera A and from camera B.

The demultiplexing from horizontal sequential format (i.e., the format of signals having horizontal lines as shown in FIG. 9B) to field sequential format (i.e., the format shown in FIG. 6A) is performed by first writing the data streams from decoder 7 into memory 8. For each data stream representing a horizontal line (of the type shown in FIG. 9B), the first portion of the data (the camera A data) is written to the lower half of the memory, and the remaining portion of the data (the camera B data) is written to the upper half. On reading the stored data from the memory, the upper half is read first, followed by the lower half. By the use of this method, the data bandwidth is constant and the multiplexed camera signals are demultiplexed in a manner suitable for display on a monitor in a left eye-right eye format.

Figure 12:
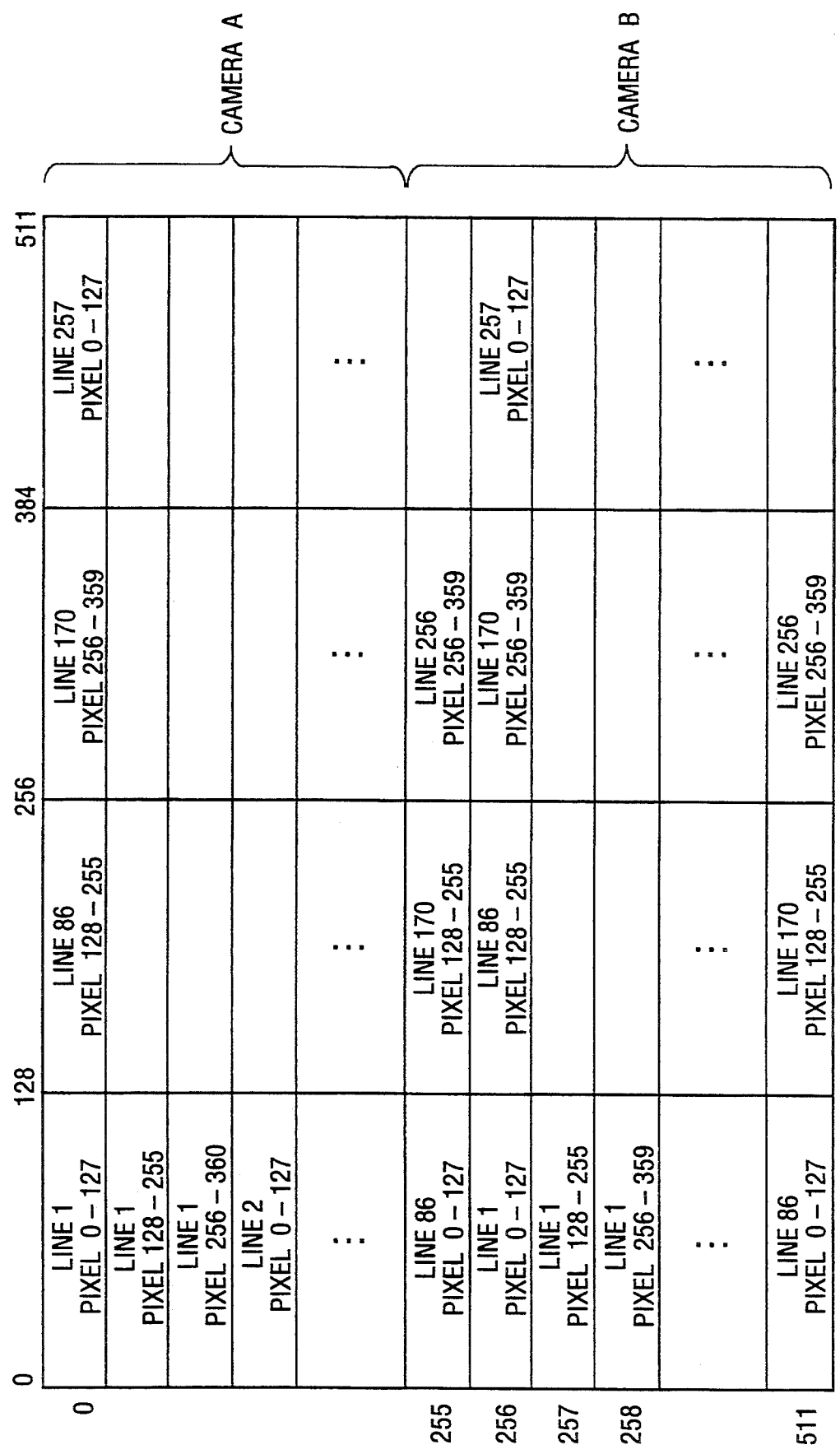
FIG. 12 is a memory allocation map showing the location of video information in VRAM storage, in a preferred embodiment of the invention. The memory is organized as 512×512 pixels by 12 bits deep.

As shown in FIG. 12, memory 8 is logically arranged as 512 by 512 pixels (by 12 bits deep). Each input video line is divided into six memory sections. Three hundred and sixty pixels of camera "A" information are stored in sections of 128, 128, and 104 pixels each. Similarly, three hundred and sixty pixels of camera "B" information are stored in sections of 128, 128, and 104 pixels each.

The first three sections represent camera A and are stored in the lower half of the memory (in rows 0, 1, and 2 of column 0). The second three sections represent camera B information and are stored in the upper half of memory (in rows 256, 257, and 258 of column 0). The memory is filled in the following order: all rows of columns 0 to 127, followed by all rows of columns 128 to 255, all rows of columns 256 to 383, and lastly all rows of columns 384 to 511 until all input data are stored. This method of writing rows eliminate the need for a separate refresh cycle.

Figure 13:
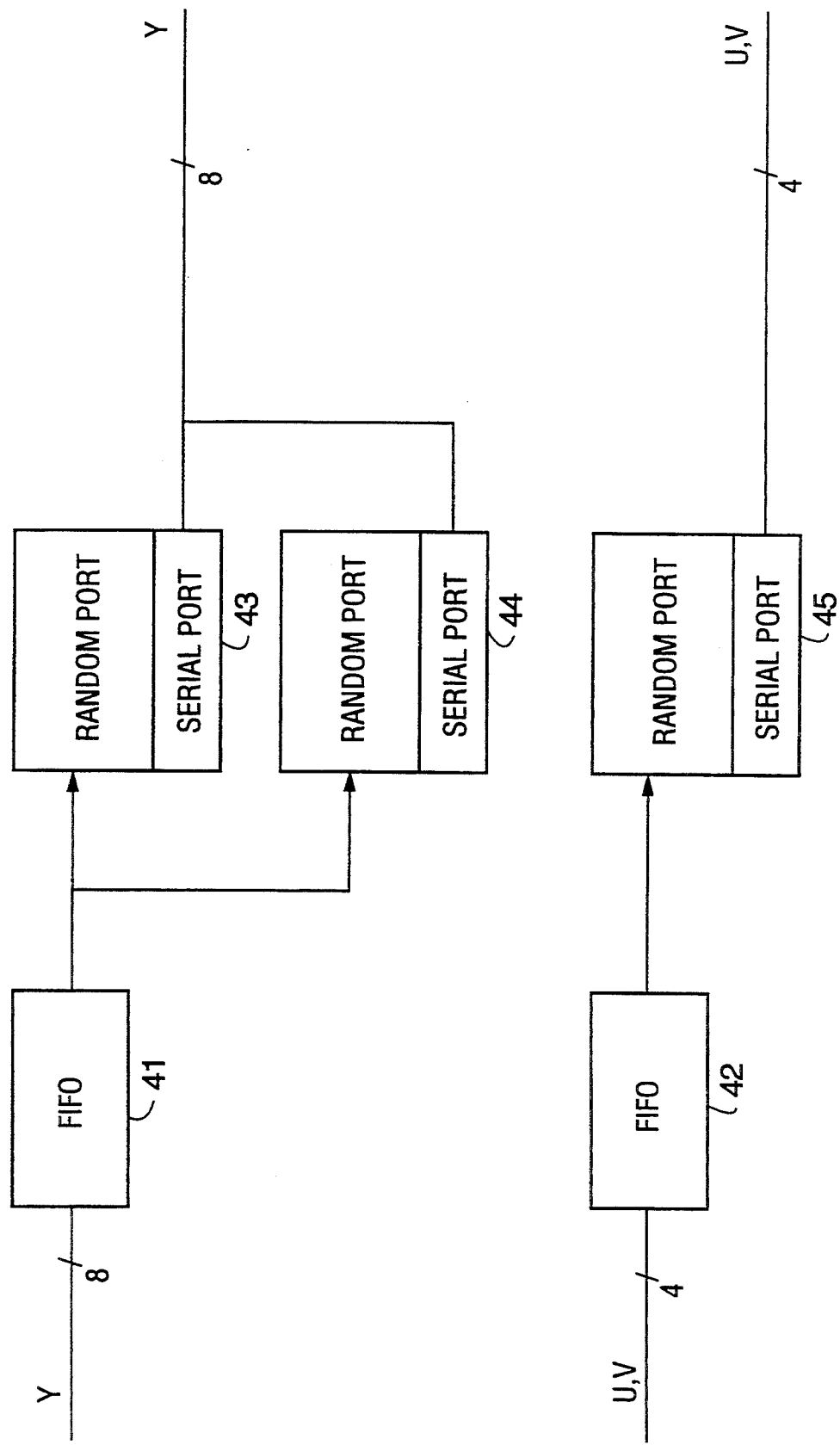
FIG. 13 is a block diagram of memory of the apparatus of FIG. 10.

With reference to FIG. 13, memory block 8 consists of FIFO sections 41 and 42 and a memory storage section comprising elements 43, 44, and 45. One field of storage requires $(360+360)*287*12=2,479,680$ bits. In the FIG. 13 implementation, each of elements 43, 44, and 45 is a 256K×4 VRAM chip, so that elements 43–45 have a total combined capacity of 3,145,728 bits. The three chips are operated in parallel, with two chips (43 and 44) allocated for the 8 bit luminance data and one chip (45) for the 4 bit chroma data. The data from decoder 7 are written into the random port of each of memory circuits 43, 44, and 45 in page mode. Using page mode, a peak bandwidth of 13.5 million writes per second (19.25 Mbytes per second) is available.

When page boundaries are crossed, the FIFO's (41 and 42) temporarily store the decoded data. Data are read out from circuits 43, 44, and 45 from the serial memory port of each of these circuits.

Address and control signals are provided to memory 8 by memory timing generator 9. Circuit 9 (to be described in detail with reference to FIG. 14) controls FIFO sections 41 and 42 and memory sections 43–45 of memory 8. Among the system constraints placed on memory timing generator controller 9 are: demultiplex the camera A and B data as described in memory sections 43–45, refresh each VRAM once during each 8 ms., operate FIFO sections 41 and 42 and the random port of each of circuits 43–45 so that no data is lost, and operate the serial port of each of circuits 43–45 so that data is output continuously. In addition, memory timing generator 9 provides the output video sync and blanking, and stereo field pulse.

Figure 14:
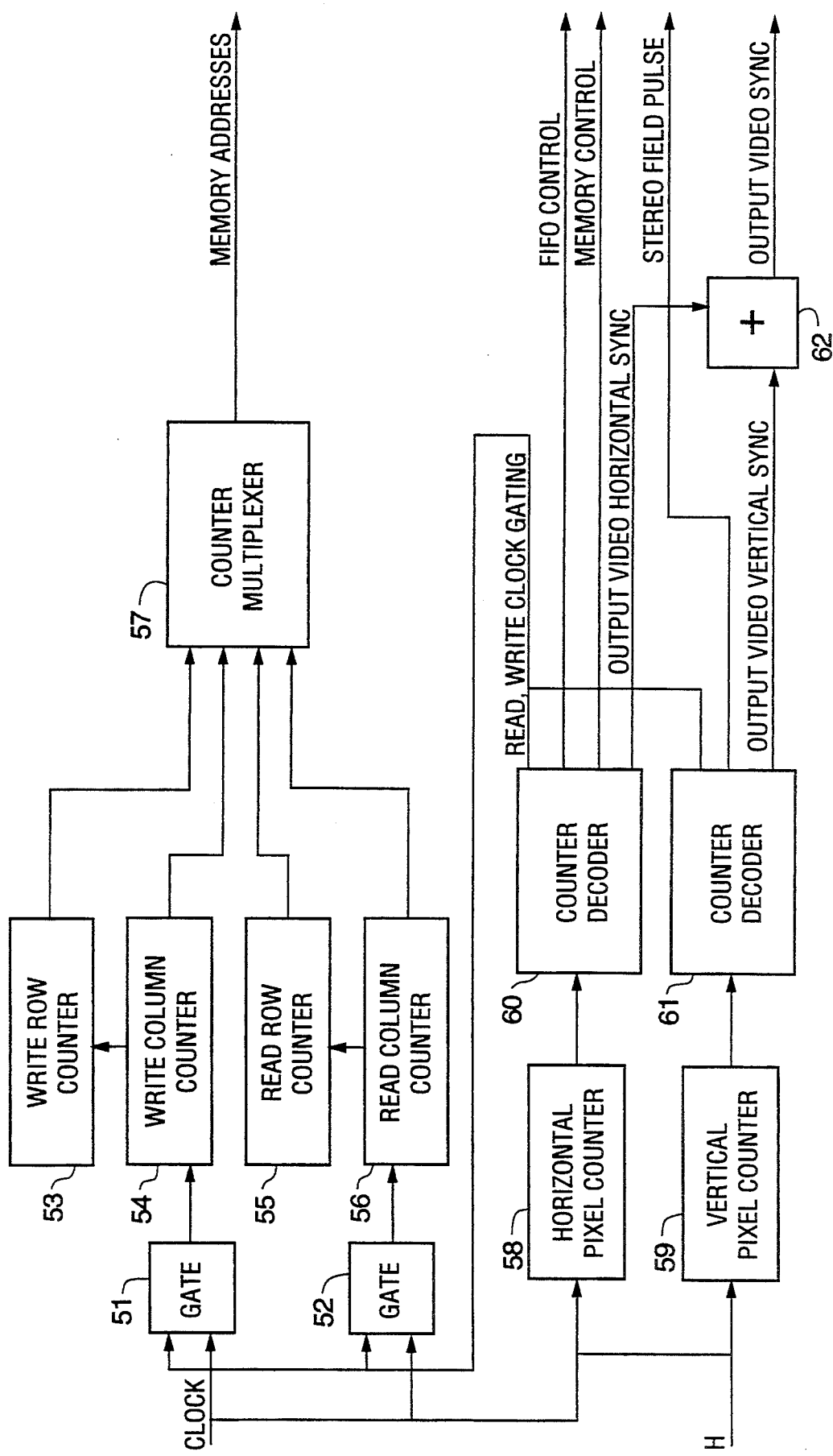
FIG. 14 shows a block diagram of a memory timing generator of the FIG. 10 apparatus, which produces the control signals for the VRAM, output video synchronizing pulses, and a stereo field pulse which synchronizes a CrystalEyes selection device.

With reference to FIG. 14, memory timing generator 9 includes counters 53, 54, 55, and 56 for generating the memory addresses, horizontal pixel counter 58, vertical pixel counter 59, and programmable decoders 60 and 61 for generating the memory and FIFO read and write control signals. Counters 53 and 54 for write rows and columns, and counters 55 and 56 for read rows and columns, provide the locations to and from which Y,U and V data are written and read. The counters are gated by circuits 51 and 52 so that only active video is stored or retrieved. The counter gating action is necessary because of special memory cycles required when crossing page boundaries and when loading the serial shift register. The timing of these special cycles is programmed into horizontal counter decoder 60 and vertical counter decoder 61. In addition, counter decoders 60 and 61 provide the output sync, blanking, and stereo field pulses. Output sync and blanking are combinations of horizontal signals, and are produced in adder 62.

With reference again to FIG. 10, color space conversion (accomplished in circuit 10) is a matrix operation which converts Y,U,V data into R,G,B form. Color space converter 10 is a Philips SAA7192 chip, in a preferred embodiment.

The digital RGB signals asserted by circuit 10 are converted to 0.7 volts peak to peak analog video in digital-to-analog convertors 11, 12, and 13. The digitalto-analog convertors have the ability to drive a RGB monitor load directly. Composite sync and stereo field information for the monitor is provided from memory timing generator 9 (described above with reference to FIG. 14).

The playback controller of FIG. 10 is designed to support a second output stage for the purpose of providing independent channels A and B for display of left and right channels on two projectors, as shown in FIG. 4, or two programs on individual monitors, as shown in FIG. 5. The second output stage can be added to an existing playback controller at a small fraction of the cost of the controller because additional VRAM memory is not required.

The operation of the playback controller changes when the second output stage is added. The playback controller becomes a single channel device which expands the channel A signal back to its original horizontal timing. The second output stage expands the channel B signal likewise back to its original horizontal timing. The channel A and B signals are then output in parallel for display on two independent monitors.

The second output stage preferably consists of a FIFO, color space convertor, and a digital-to-analog converter (DAC). The input of the FIFO is connected to the output of decoder 7 (in FIG. 10). Upon command from memory timing generator 9, the FIFO expands the channel B information from the decoder back to the standard NTSC or PAL timing. The color space converter processes the Y,U,V information into R,G,B. The DAC converts the digital R,G,B signals into analog signals for sending to the display device. The VRAM in the playback controller is set to zero delay. Therefore the signals from both the second output stage and the controller output stage video are presented to the display devices at the same time.

Figure 15B:
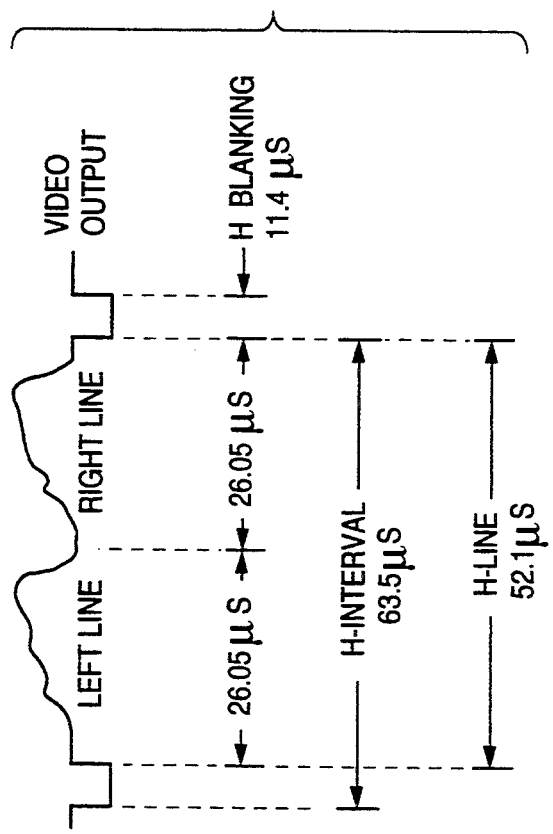
FIG. 15B is a video waveform, representing a portion of the output of the line switcher of FIG. 15A.
Figure 15A:
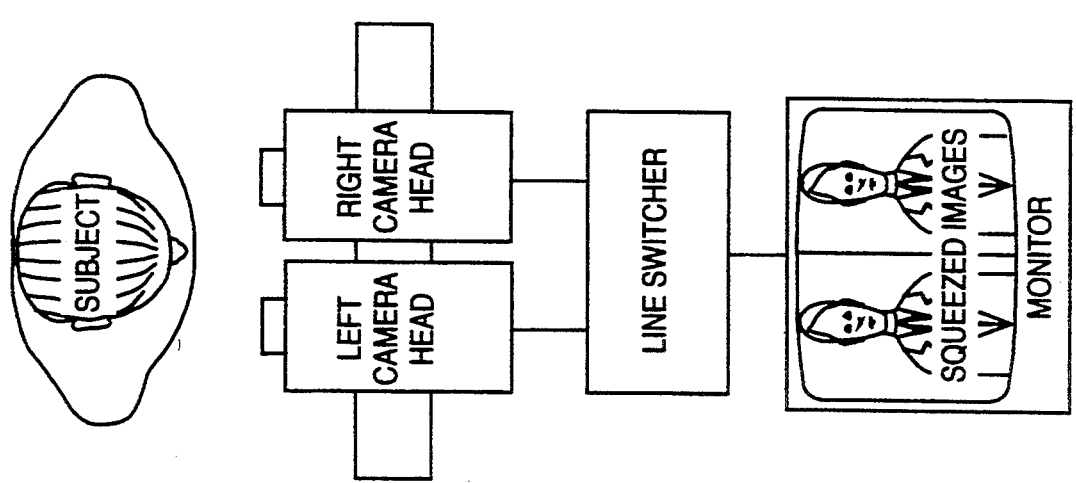
FIG. 15A is a schematic of the left and right camera heads of a stereoscopic camera, each operating at twice the horizontal frequency to produce the stereoscopic format of the present invention.

There are other techniques for producing or displaying stereoscopic video images compatible with the sidefield format described in this disclosure. Such techniques, through suitable adjustment and modification of cameras and video projectors, can simplify and reduce the cost of producing the desired result. In FIG. 15A, we see the setup for such a camera system, and the resulting video line output is shown in FIG. 15B. The signal of FIG. 15B satisfies the NTSC protocol. As mentioned earlier, the following explanation assumes that the signal to be displayed satisfies the NTSC protocol for didactic reasons (although the invention will work with any video standard). The subject is videographed by the left and right camera heads. The camera heads have had their electronics modified in one respect: the horizontal line frequency has been doubled so that a horizontal line is scanned in half the usual time. The usual horizontal period (the duration of an active or picture forming line plus the blanking interval) in NTSC video is 63.5 microseconds. The minimum value for horizontal blanking is 11.4 microseconds, leaving 52.1 microseconds for the duration of a horizontal line. In the case of these camera heads with modified drive circuitry, a horizontal line is scanned in 26.05 microseconds. Once one horizontal line, say the horizontal line from the left camera, has been scanned, it is added to the corresponding line scanned by the right camera head which also has a duration of 26.05 microseconds. This is accomplished by feeding the two lines, the left line first and then the right line, into a multiplexer (the "line switcher" shown in FIG. 15A). The process is repeated with the addition of the H blanking signal so that the video output will be compatible with the normal NTSC protocol. When played back, as shown on the monitor in FIG. 15B, the two images will appear to be squeezed in the horizontal direction and will be completely compatible with the format described in this disclosure. The important advantage here is that if the cameras are dedicated to perform in the stereoscopic mode, or possibly switchable to perform in the stereoscopic mode, the video multiplexer may be omitted.

The selection of which line, left or right, to be the first is arbitrary. It is important, however, to maintain the standard once a choice has been made. Moreover, the context of this disclosure is for moving images, however, it should be obvious to a person skilled in the art that the virtues of the approach described here are such that they may as well be applied to a still image video camera.

As is shown in FIG. 15B, a left line which is 26.05 microseconds is added to a right line which is 26.05 microseconds to form a video line of picture information which is 52.1 microseconds long. This is compatible with the multiplexing technique described in this disclosure. Because the other parameters of the video protocol remain unchanged, i.e., the vertical frequency has not been modified, the number of scanned lines remains the same, and the position of the horizontal and vertical sync blanking signals remains in the standard position for NTSC, the signal may be recorded on a standard recorder or transmitted over an NTSC transmission line.

When played back as shown in FIG. 15A, on a standard monitor, the result will be two horizontally squeezed images. When played back through the display controller which is the subject of this disclosure and on a stereo-ready 120 field/second monitor, the result is a field sequential stereoscopic image ready to be viewed with the appropriate selection device.

Using an approach which is related to that which has been described immediately above, it is possible to play back stereoscopic images using video projectors, as is shown with the help of FIGS. 16A through 16E, 17, and 18. We call this a "dual output" scheme for stereoscopic display with two projectors or display means such as a virtual reality stereoscope. The "side by side" compression scheme proposed here leads to this interesting and useful variation. The "above and below" subfield scheme disclosed in U.S. Pat. No. 4,523,226 depends upon the display device scanning at twice the vertical rate of the source for deanamorphosis of the images. Electronic means are used to add the vertical timing synchronization signals required. The present sidefield scheme allows for the deanamorphosis of the horizontal compression by running the display means at twice the horizontal rate, with appropriate horizontal timing added by electronic techniques.

By running the horizontal rate of the display devices at twice the source rate and adding horizontal timing pulses to the signal meant for the second device, the "stretch" of the display device will match the compression of the source as shown in FIG. 15, producing an image of the desired aspect ratio. By using a fast video demultiplexer, two separate video signals are produced and each is sent to the appropriate display devices.

Figure 16A:
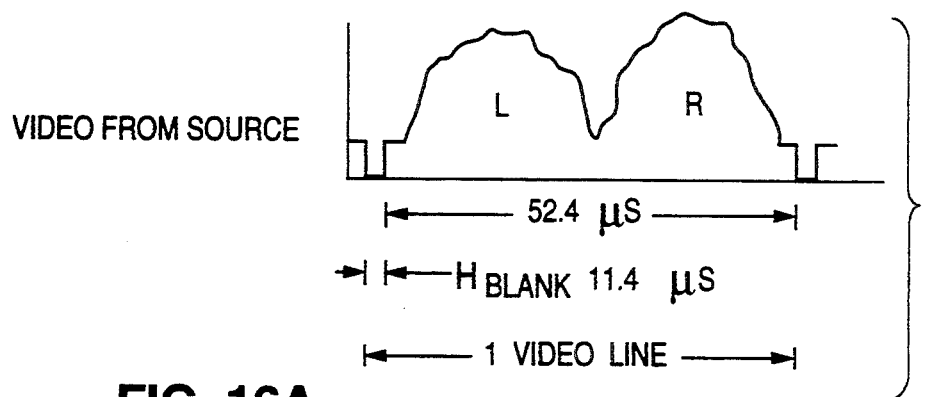
FIG. 16A represents one active line (H) of a video type signal with two channels horizontally compressed as described in this disclosure.
Figure 16B:
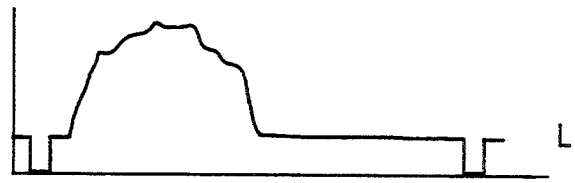
FIG. 16B represents a first output of a 1:2 demultiplexer which receives the FIG. 16A signal. The signal of FIG. 16B comprises the existing horizontal sync signal and the first (left) video signal, which has an active picture display time of about H/2.
Figure 16C:
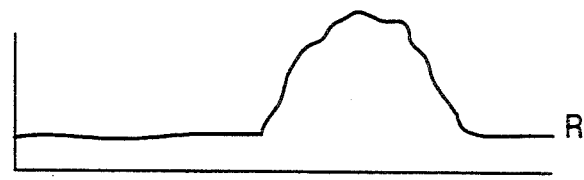
FIG. 16C represents a second (right) video signal output from the same demultiplexer mentioned with reference to FIG. 16B.

Referring to FIG. 16A, we show one active line (H) of a video signal with two channels horizontally compressed following the teachings of this disclosure. Using the existing horizontal sync as a time reference, this signal goes to a precisely timed 1:2 demultiplexer (i.e., the video switch shown in FIG. 17). FIG. 16B illustrates a trace of the first output of the demultiplexer and comprises the existing horizontal sync signal and the first (left) video signal, which has an active picture display time of about H/2. FIG. 16C shows the second (right) video signal from the same demultiplexer. It is also about (H/2) in duration, but lacks horizontal sync information. The same timing and delay circuits (shown in FIG. 17) used to control the demultiplexer are employed to produce the signal of FIG. 16D from that of FIG. 16C, by creating and adding a new horizontal timing or sync signal at the correct time. Slight variations in this insertion time will allow a range of "horizontal shift" of the image for stereoscopic image alignment adjustments.

Figure 16D:
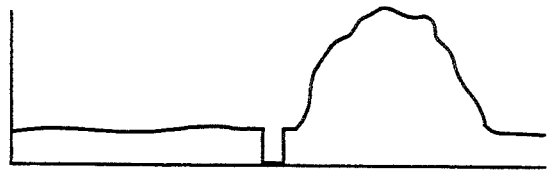
FIG. 16D represents the second (right) video signal of FIG. 16C with a horizontal synchronization signal added electronically.
Figure 16E:
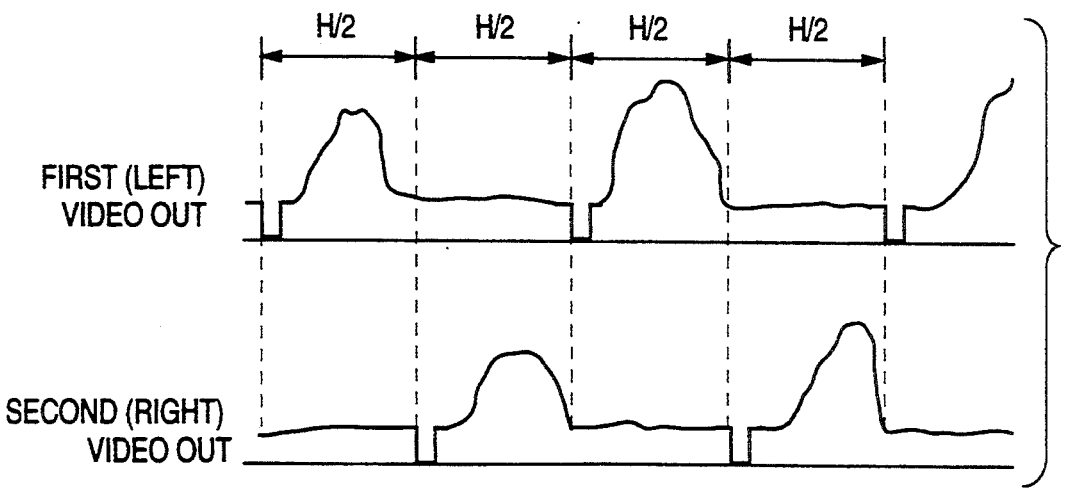
FIG. 16E shows the timing relationship of the two signals of FIG. 16B and FIG. 16C and their sync signals.
Figures 17, 18:
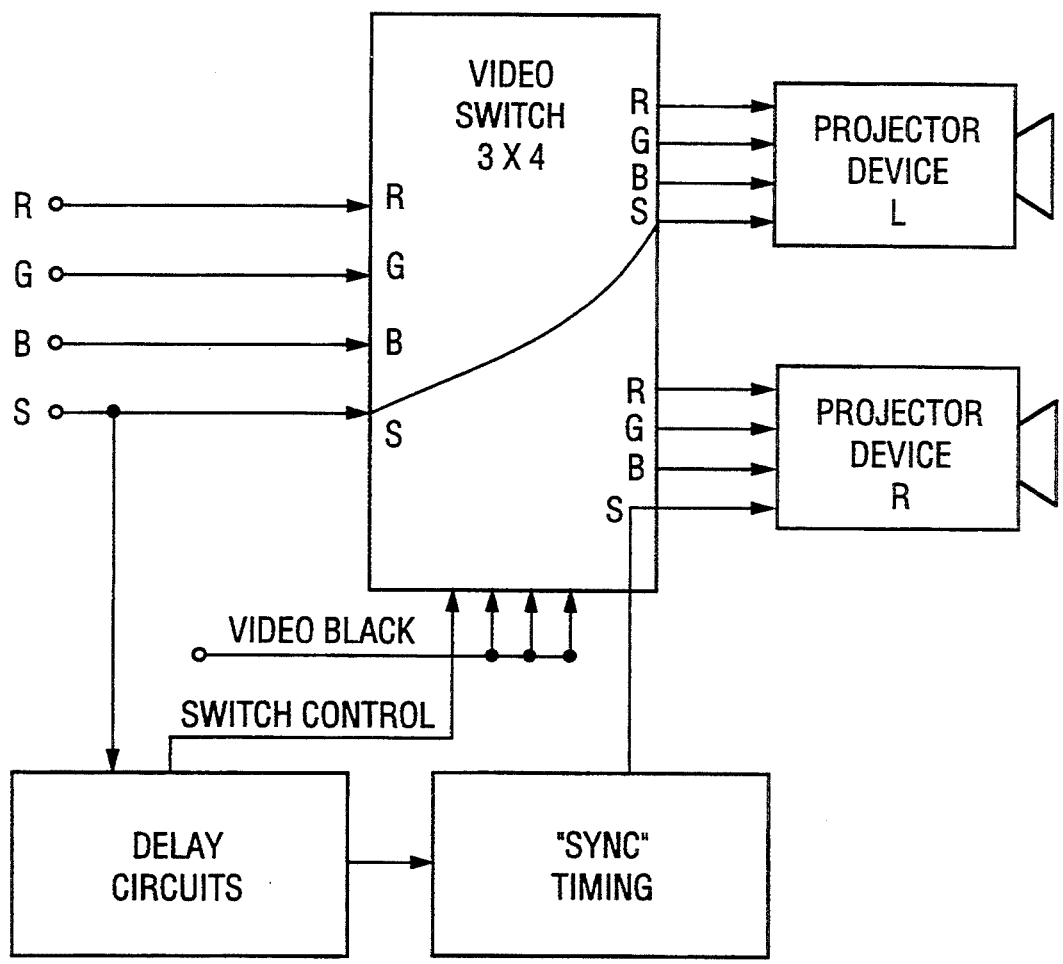
FIG. 17 is a block diagram of a means for implementing the scheme described with reference to FIGS. 16A through 16E, for an RGB source, such as a computer.
FIG. 18 is a diagram representing a typical demultiplexer signal scheme with all timing referenced to horizontal sync from the source equipment.

FIG. 16E shows the timing relationship of the two outputs of the video switch of FIG. 17 and their sync signals (i.e., the signals of FIGS. 16B and 16D). With two video projectors (shown in FIG. 17) projecting on the same screen, using the same selection technique of polarized light, as described with reference to FIG. 4, the result is lines which are presented sequentially at nominally 60 fields/second/eye. First the left line (i.e., the signal of FIG. 16B) is written by the left projector, then the corresponding right line (the signal of FIG. 16D) is written by the right projector. By adding additional memory and circuitry at each output, the projector (or display devices) of FIG. 17 could produce continuous images at any refresh rate, but this isn't needed for most applications.

In a practical implementation of this invention, it is required to maintain a constant "video black" signal level during the (H/2) time when there is no active video on each channel (accordingly, FIG. 17 shows that a "video black" signal is supplied to the video switch). When there is active video on a channel, appropriate video DC restoration or "clamping" is required. These techniques will prevent black level shifts leading to the possibility of contrast mismatch between the left and right channels and image flicker.

This technique will work not only for video protocols such as NTSC, it will also work for component or composite video, or computer generated images (i.e., the system of FIG. 17 could be used to process input signals of any of these types).

Figure 8:
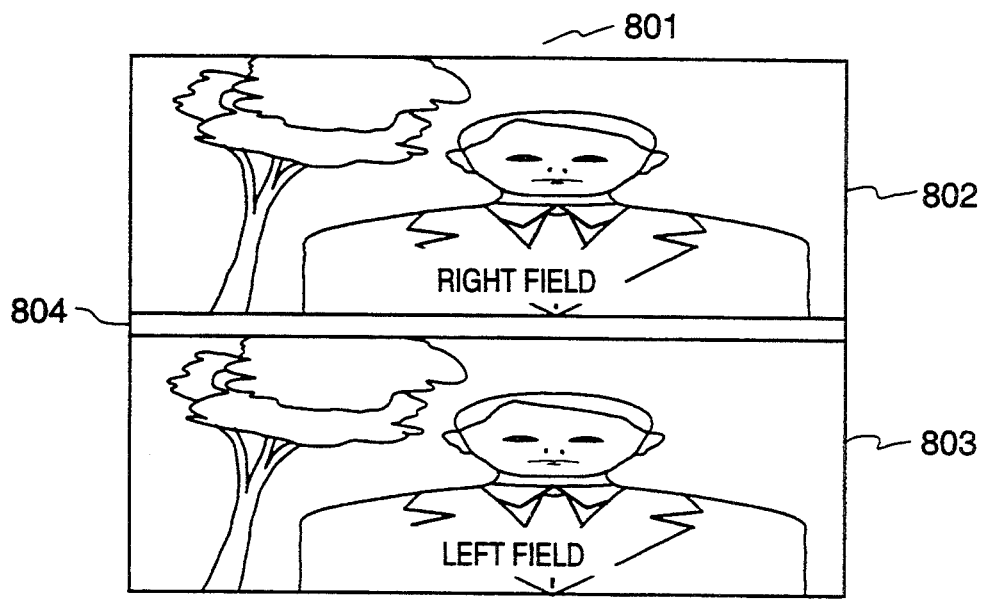
FIG. 8 represents a conventionally multiplexed stereoscopic video signal as it would appear when displayed on a conventional monitor, with vertically compressed images in an over-and-under format.

A typical demultiplexer signal sequence implemented by the FIG. 17 apparatus is shown in FIG. 8. All timing is referenced to horizontal sync from the source equipment.

Figure 19:
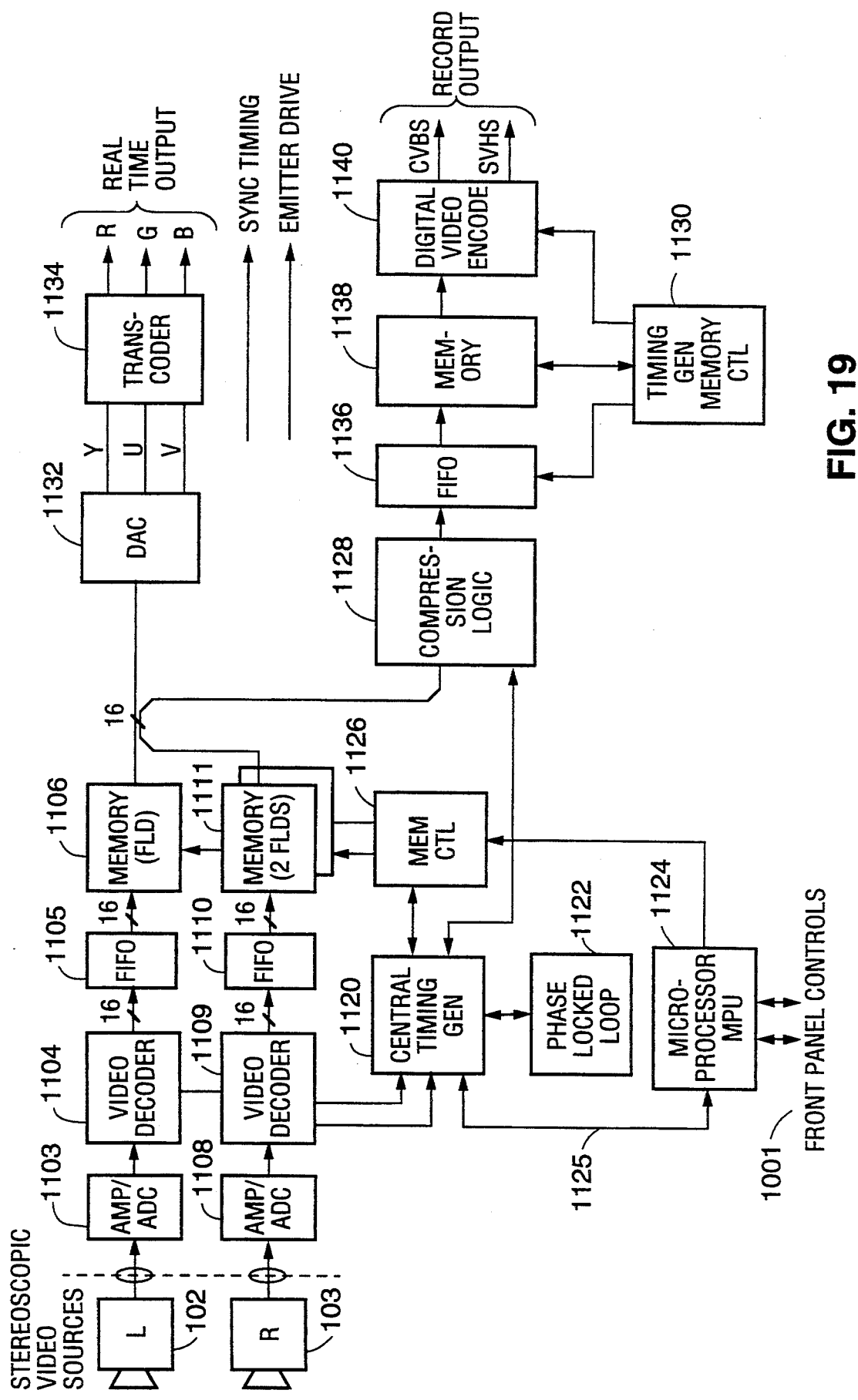
FIG. 19 is a block diagram of a preferred embodiment of the inventive camera controller, showing the major processing sections.

A preferred embodiment for a camera controller according to the present invention is illustrated in FIG. 19. This camera controller receives composite video (CVBS) or component video (SVHS) and provides RGB and Sync outputs for the real time display and simultaneously provides CVBS and SVHS outputs for the recording device. The camera controller is capable of decoding and outputting several standard video formats such as NTSC and PAL. The real time display output drives a computer monitor and provides full resolution real time display of field sequential stereoscopic video. The record output produces a compressed format suitable for recording the stereoscopic image on a standard video recorder for later playback using the playback controller device already described.

The camera controller is provided with several front panel controls 1001 to adjust characteristics of the real time displayed image and the recorded image. Controls are provided to adjust relative horizontal and vertical positions of the right and left images. Also, front panel controls adjust coloration characteristics of the real time displayed image.

In a preferred embodiment, the right and left video sources which supply the stereoscopic image are genlocked with respect to each other such that right and left video input to the camera controller maintains a particular timing relationship. Genlock is a means to synchronize the horizontal and vertical relationship of different video sources. It is important to maintain a field locked timing relationship between the input sources in order to avoid particular motion artifacts. These motion artifacts are explained in detail in the following papers by Lenny Lipton: "Binocular Symmetries as Criteria for the Successful Transmission of Images in the StereoDimensional Brand Stereoscopic Video System," SPIE Vol. 507 (1984), pp. 108–113; and "Temporal Artifacts in Field-Sequential Stereoscopic Display," SID 91 Digest, pp. 834–35.

In the event that the left and right video sources are not appropriately locked, the camera controller functions but displayed and recorded stereoscopic video is subject to these motion artifacts.

As previously described, the camera controller receives left and right video signals from the left and right video cameras 102 and 103, respectively. The left input provides an image having a perspective corresponding to the left eye, while the right input accepts video with perspective corresponding to the right eye. According to the camera controller of the present invention, these inputs are then decoded, processed, multiplexed, re-encoded, and displayed by the camera controller in such a way as to provide field sequential, flickerless stereoscopic video signal.

Each of the video channels is decoded in the same manner, namely the left input 102 is processed by signal processing section 1103 and decoded by video decoder 1104 before being presented to FIFO buffer 1105 and field memory 1106, and the right input 103 is processed by signal processing section 1108 and decoded by video decoder 1109 before being presented to FIFO buffer 1110 and field memory 1111. A composite video input or a component luma input is selected by an external switch and is buffered by a video multiplexor. The output of the multiplexor feeds an automatic gain control circuit (AGC) which normalizes the amplitude of the video signal to optimize the range of the digitized video data. The AGC circuit in turn feeds a low pass filter (LPF) which removes high frequency components in the video signal which would otherwise cause aliasing artifacts when sampled. The resulting low pass filtered composite video signal (or component luma signal) is then converted from an analog signal to a digital representation by an analog to digital converter (ADC). The resulting digital data stream is provided to the video decoder.

In the case of a component video input signal, the component chroma signal is similarly buffered, normalized by an AGC circuit, low pass filtered to remove unwanted frequencies, then digitized by a separate ADC, then provided to the video decoder.

In a preferred implementation, the composite and luma video multiplexor, AGC circuit, low pass filter, and ADC are provided by a single integrated circuit chip, namely the Philips TDA8708 video analog input interface. The component chroma buffer, AGC circuit low pass filter, and ADC are provided by another chip, namely the Philips TDA8709 video analog input interface.

Figure 20:
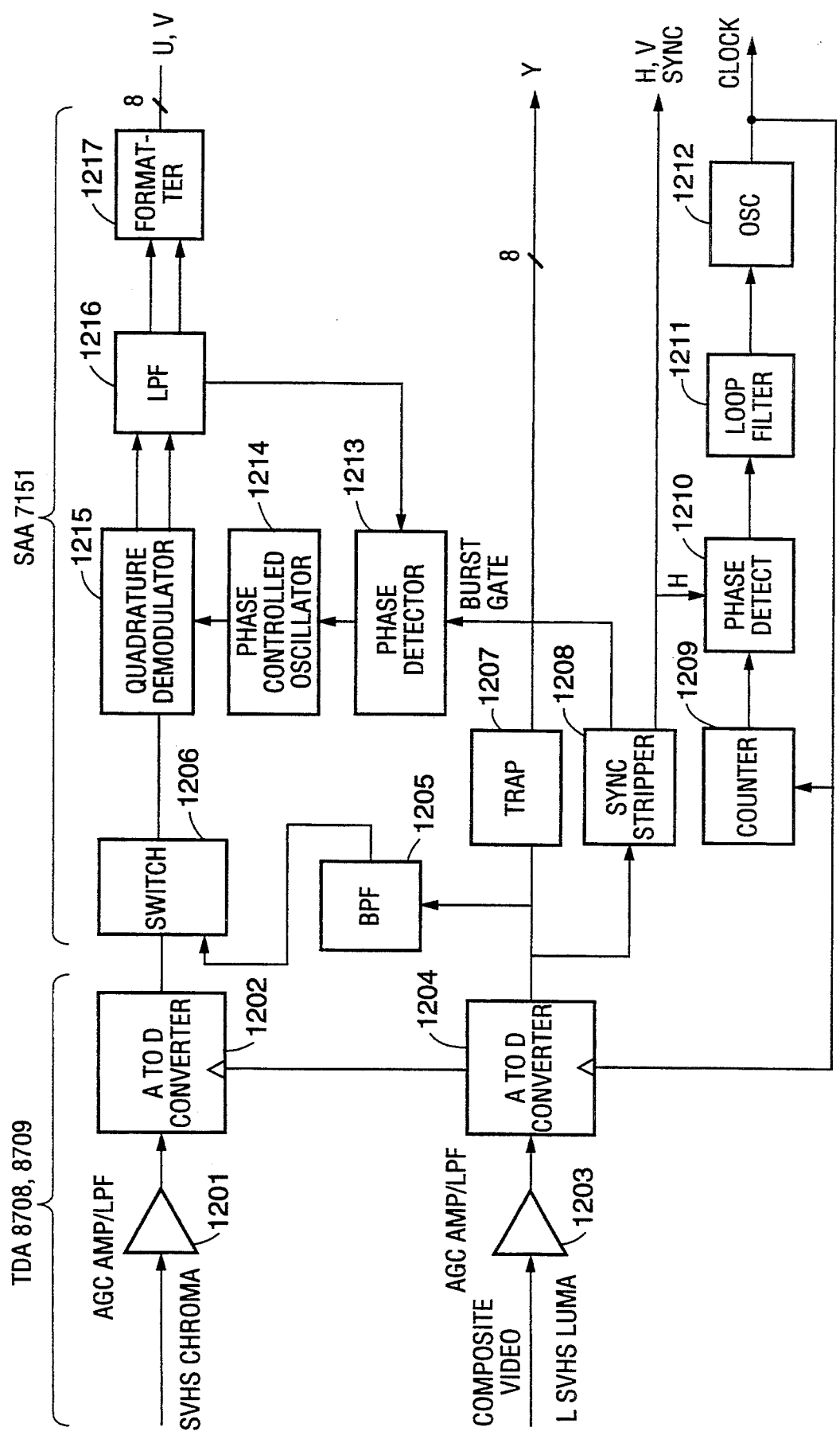
FIG. 20 is a detailed block diagram of the decoder section of the camera controller of FIG. 19.

The resulting digitized composite video or component luma and chroma are presented to the digital decoders 1104 and 1109, respectively. In a preferred implementation, illustrated in FIG. 20, the decoder is a Philips chipset composed of one Philips SAA7151B multi-standard decoder and one Philips SAA7157 clock generator.

The decoder includes three input video processing sections: a sync stripper and phase locked loop, a chroma demodulation means, and a luminance filtering means. The sync stripper 1208 separates the horizontal and vertical sync timing edges from the incoming video. Horizontal and vertical sync are buffered out of the circuit and are used later in memory timing generator 1120.

Horizontal sync timing is used within the decoder as a reference for a clock generator phase locked loop. This clock is used to run the memory and output circuitry and is available at 27 MHz and 13.5 MHz. The phase locked loop includes phase detector 1210 (which compares the reference input H to a divided down version of the oscillator clock), filter 1211, oscillator 1212, and counter 1209. Counter 1209 can be programmed to set the output clock frequency at 13.5 MHz when the input signal has NTSC or PAL timing. The result is that there are 858 clocks per horizontal line of information, 720 of which are considered to be the active video interval and stored in memory. Because the clock is locked to the input horizontal sync and it is used to derive the memory timing and output timing, the output signal and input signal are phase coherent and no time base correction is performed on the video.

The simplified luminance path within the decoder includes trap filter 1207, which removes the chroma component of the input video signal. A disadvantage of trap 1207 is that it reduces the high frequency information in the video. In the SVHS mode, trap 1207 is disabled and the full luminance frequency resolution is preserved.

The chroma path within the decoder processes and demodulates the color component part of the video signal. Quadrature demodulator 1215 receives chroma through switch 1206 from either of two sources: directly from the SVHS digitizer 1202 or through bandpass filter 1205 from the encoded video signal. Switch 1206 performs source selection. Demodulator 1215 is of the quadrature type and decomposes the phase encoded chroma information into U and V components. Demodulator 1215 receives zero and ninety degree subcarrier signals from a phase locked loop including phase detector 1213, oscillator 1214, and low pass filter 1216. Phase detector 1213 strives to maintain a constant zero degrees of phase between the oscillator output signal and the input chroma at burst time. Therefore, a burst gate is provided to circuit 1213 by sync stripper 1208.

After undergoing lowpass filtering in filter 1216 to remove unwanted demodulation frequencies, the U and V eight-bit data are combined in circuit 1217 into a four-bit 4:2:2 subsampled word. Therefore each 16 bit output word consists of eight bits of luminance from trap 26 and eight bits of chroma from combiner 1217. Because the chroma U and V are subsampled, two pixels of luma are required to transfer one pixel of color.

The 16 bits of decoded digital video data from the left video channel 102 is presented to a first-in-first-out (FIFO) buffer 1105 which feeds field memory 1106. In a preferred embodiment, the FIFO buffer 1105 is implemented with two octal line buffer devices. The FIFO buffer 1105 is required to buffer decoded video data at times when the field memory 1106 may not be immediately available for writing. Data is shifted out from the FIFO buffer 1106 and written into the left field memory 1106.

Figure 21A:
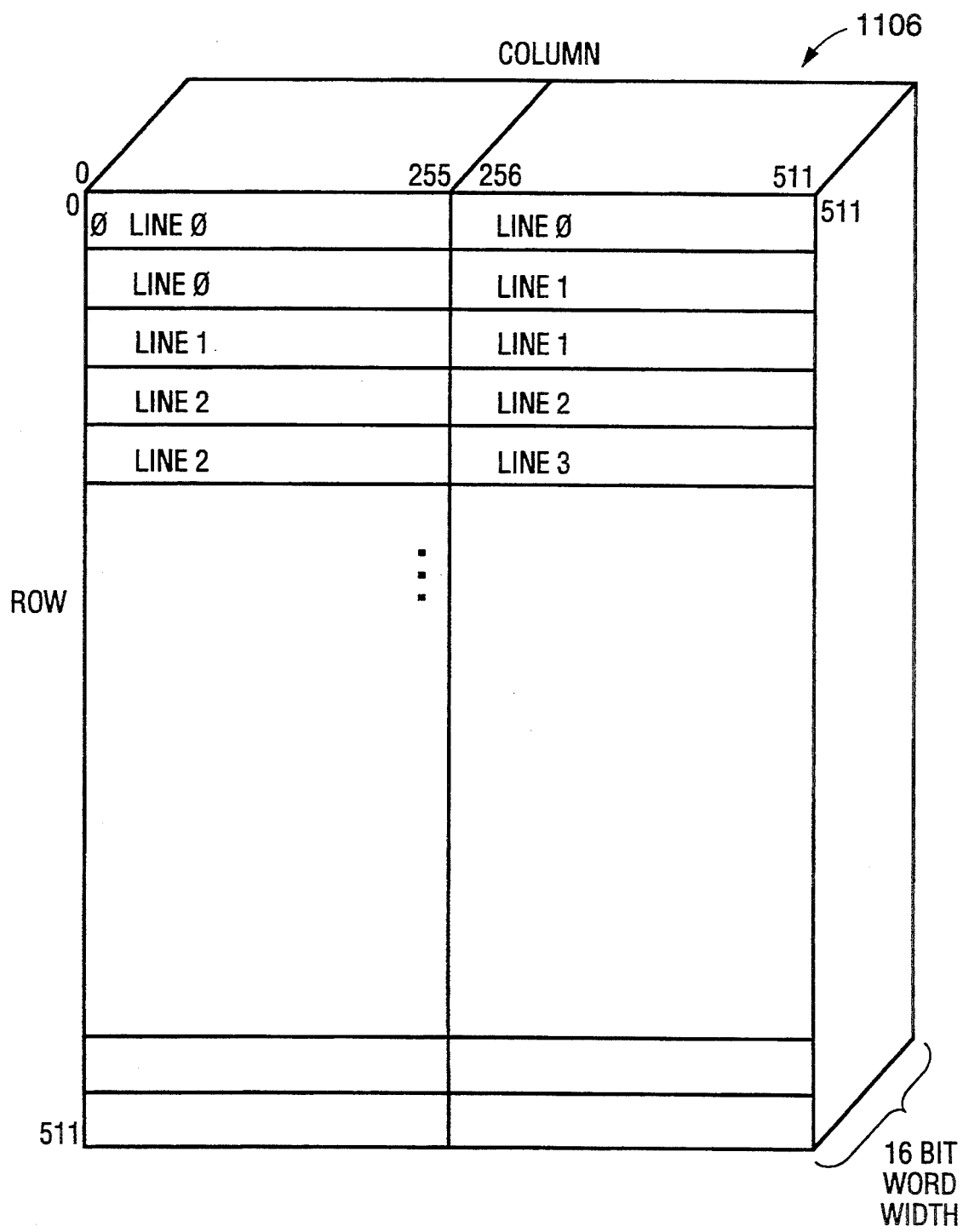
FIG. 21A is a memory allocation map showing the location of left field video information in VRAM storage in a preferred embodiment of the invention.
Figure 24:
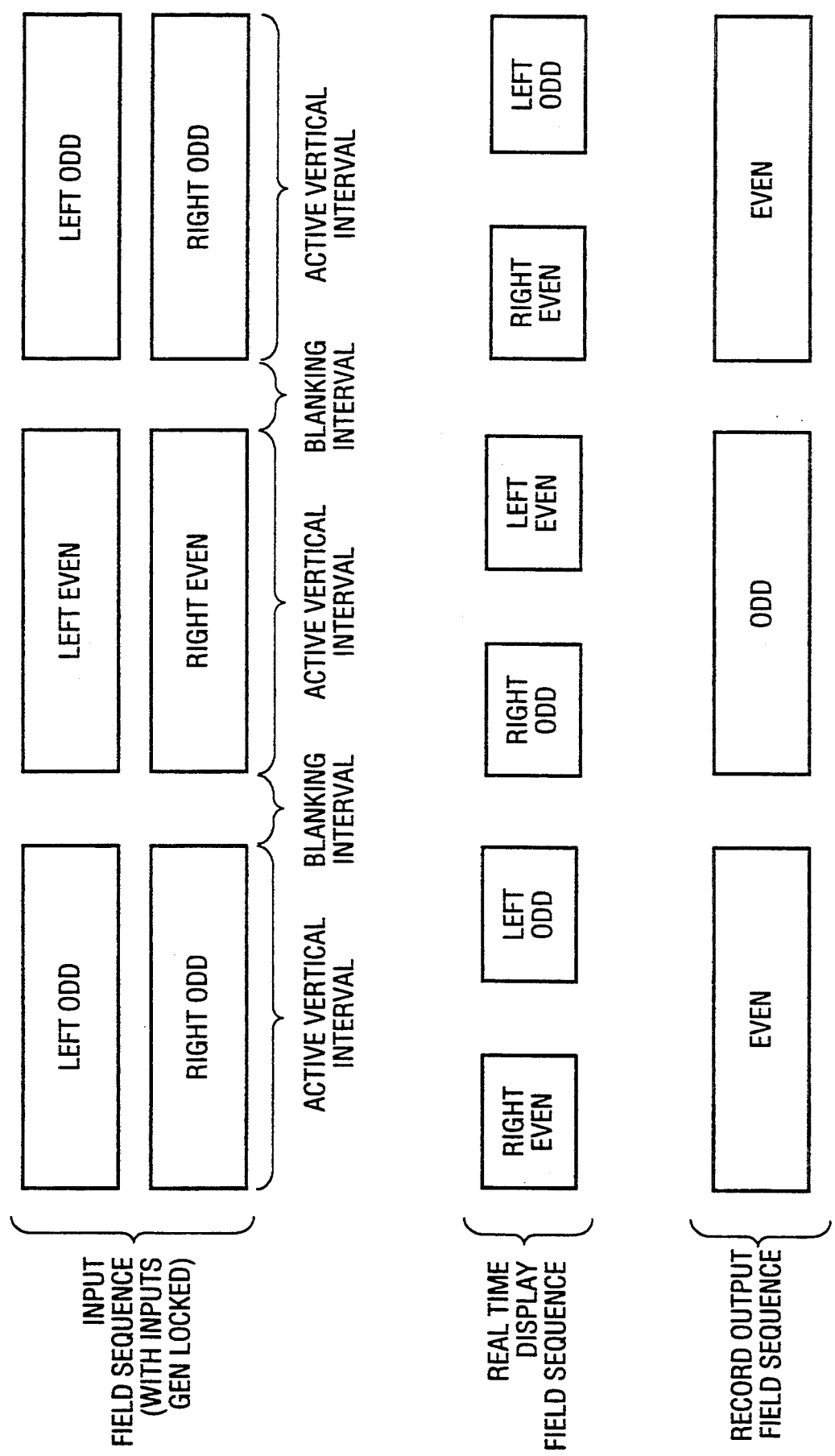
FIG. 24 is a block diagram of the relative timing sequence of the input signals, the real time display output and the record output.

As illustrated in FIG. 21A, the left channel field memory 1106 has a 16 bit storage word width per pixel, eight bits for luma and eight for chroma. Each line stored in the FIFO buffer 1105 therefore consists of 768 stored pixels. However, the video decoder 1104 actually only provides 720 pixels per line of active picture information. Padding the line out to 768 pixels per line greatly simplifies addressing and control of the storage memory 1128. According to some video standards, it is necessary to store up to 312 lines per field. Since it is possible to synchronize the output field sequence of the camera controller with that of the input(s), as shown in FIG. 24, it is possible to optimize the amount of storage needed by one or the other input channel. By default, all output sequences are synchronized with the left input video source requiring only a single field of storage memory on the left side. Because of this economy, the same storage buffer is used to alternately store odd and even left video fields.

Since digital video is represented as a sequence of lines which are comprised of a sequence of pixels, a Video Random Access Memory (VRAM) is particularly well organized for use as video field and frame buffers. A VRAM is a specialized Dynamic Random Access Memory (DRAM) which employs a random access read/write port of the type found on a conventional DRAM, but also employs a special serial access port which is well suited for reading and writing sequential data.

The preferred embodiment of the present camera controller organizes the left field memory 1106 as four 256K by 4 bit VRAM devices, yielding a 256K × 16 bit word field memory. A 256K by 4 bit VRAM device is organized as 512 rows of 512 columns by 4 bits. The left field memory is organized simply as a line FIFO where 768 pixels of the first line (line 0) are written using the random access port starting at the first DRAM location at row 0 column 0 through row 1 column 255. Then 768 pixels of the second line (line 1) are written starting at row 1, column 256 through row 2, column 511. Subsequent lines are written in progressive sequence, each using one and one half rows of storage, until the end of the field is reached. This method of storage allows more than 340 lines per field to be stored using inexpensive VRAM devices, and it easily accommodates common video standards.

The right input video is buffered in a very similar fashion. 16 bits of decoded digital video data from the right video decoder 1109 are presented to FIFO buffer 1110 which in turn feeds right field memory 1111. Again, in a preferred embodiment, the FIFO buffer 1110 is implemented with two octal line buffer devices, wherein data is shifted out from the FIFO buffer and written into the right field memory 1111.

Figure 21B:
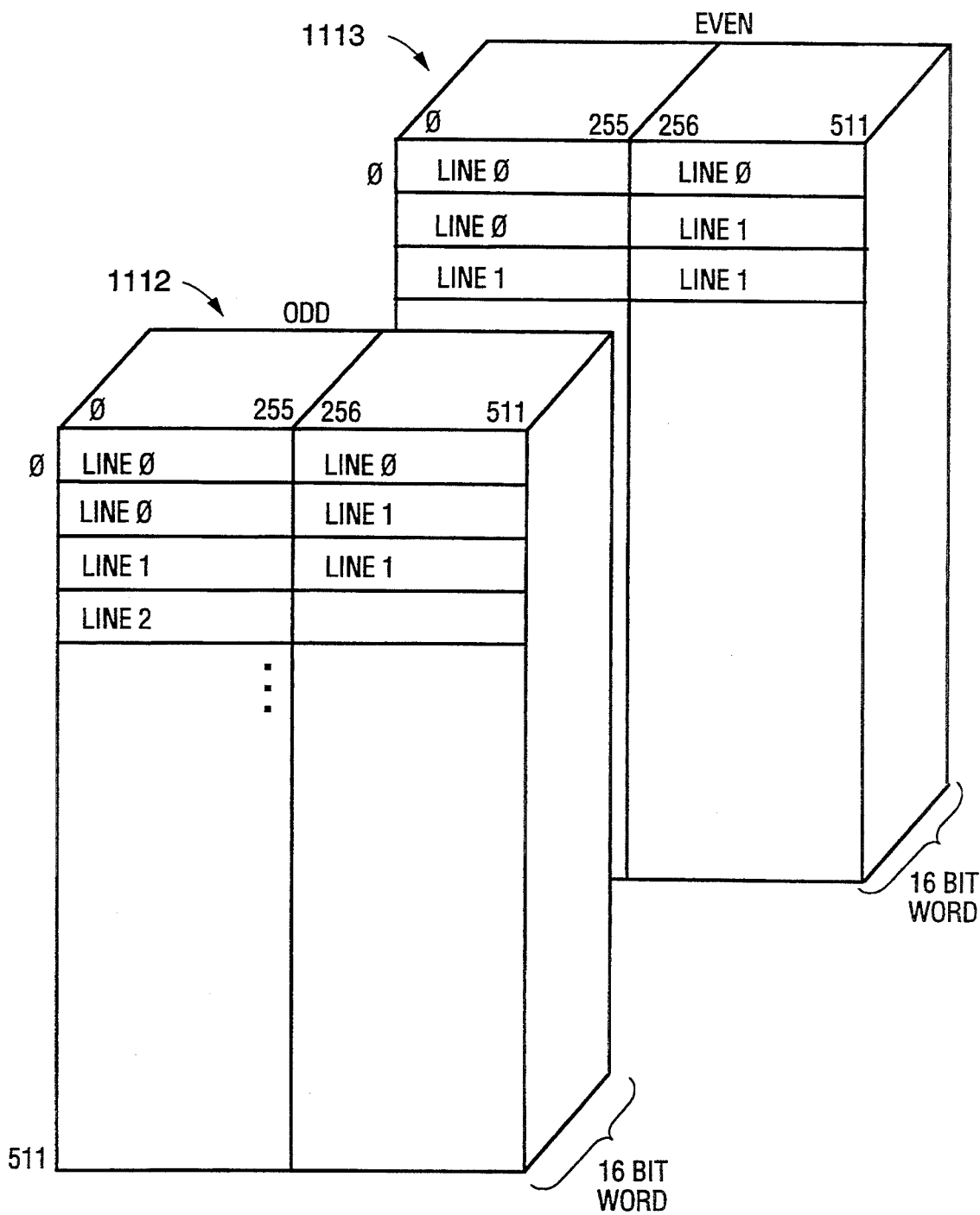
FIG. 21B is a memory allocation map showing the location of right field video information in VRAM storage in a preferred embodiment of the invention.

However, unlike the left field memory 1106 which uses the same memory to store odd and even video data, the right field memory 1111 maintains separate buffers 1112, 1113 for each of the right odd and right even input fields, as shown in FIG. 21B. This allows the possibility of having no timing relationship between the left and right input video sources. In a preferred embodiment, the right field memory 1111 is implemented using eight 256K by 4 VRAM devices. These devices are organized as 2 banks 1112 and 1113 (one for the odd field and one for the even field) of four 256K by 4 bits devices, yielding dual 256K×16 bit word field memories.

Each of the right and left field memories are controlled by a memory controller 1126. For each of the left and right memories, the memory controller 1126 includes an address generator, a control generator, and a control state machine.

The address generator comprises column counters used for addressing page writes, an input line segment counter used for addressing memory rows during writes to the field memory, an output line segment counter used for addressing the line being shifted out of the field memories, and finally an offset register used for initializing relative horizontal position of the displayed line. Each of the address sources are multiplexed to drive the VRAM address bus.

The control generator generates all controls signals required to unload line FIFO's in order to write the random access port of the VRAM with video data and to initialize the serial access port for unloading. Control signals are generated largely using state information from the control state machine.

The control state machine samples timing signals from the video decoder to determine when to unload FIFO data and sampler timing signals from the display controller to determine when and how to initialize serial access ports.

In a preferred embodiment of the camera controller, both left and right memory controllers are implemented using field programmable gate array (FPGA) technology. FPGA's provide a dense and very flexible means for implementing complex data path, combinational, and sequential logic. In this application, a Xilinx 3000 family FPGA is used.

Two additional functions are provided by the memory controller 1126. A freeze frame function is provided by suspending video data writes into the field memories. This is done under microprocessor control. By suspending the writing of new video data into the field memories but allowing currently stored data to continue to be shifted out, motion is frozen. A still stereoscopic image is displayed on the real time display and presented to the record output.

A left to right image transposition is provided by writing video data into the field memories in descending address order rather than the usual ascending order. The video data is always read out of the field memory in ascending order. This causes a left to right transposition of each horizontal video line. This provides the ability to view the image as if in a mirror and is done entirely by electronic means. This 'mirroring' effect is useful in some stereoscopic applications.

A dedicated microprocessor (MPU) 1124, such as the Motorola 68HC11, controls a variety of functions, including initialization, timing control, and supervisory functions.

The video decoding, encoding, and processing hardware contain a number of programmable parameters for controlling settings such as video standards, hue controls, digital filter characteristics, and image enhancement characteristics. Status registers are provided for reading back video decoder status.

In a preferred embodiment, the video hardware is connected to a Philips standard 11C bus (a simple two wire communication bus used by the Philips chipset).

The MPU drives the 11C bus and performs power up initialization of the video hardware. Similarly, via the 11C bus, the MPU systematically polls the video hardware for status changes which may require action by the MPU.

In a preferred embodiment, the logic of the central timing generator 1120, the memory controller 1126, the digital compressor 1128, and the record output controller 1130 may be realized using Field Programmable Gate Arrays (FPGA's). The FPGA's require initialization from an external device at power up and re-initialization. The MPU performs these initialization functions via a handshaked download protocol. Once initialized, the MPU can then control specific logic within the FPGA devices via an 8 bit MPU bus 1125.

The MPU performs several real time control tasks such as vertical banking and vertical field offset control. Additionally, front panel controls are polled and interpreted by software running on the MPU. The MPU control of these real time supervisory functions simplifies the hardware implementation and provides a manufacturing cost advantage.

The central timing generator 1120 generates horizontal and vertical timing references for the real time stereo display output as well as the record output. The central timing generator 1120 controls a phase locked loop 1122 which generates clocking information for the real time stereo display output. The central timing generator may be implemented using a Xilinx 3000 family FPGA.

The Xilinx FPGA can be initialized at power up or re-initialized on command to perform a particular function. Since the parameters of the central timing function can vary significantly dependent upon a given video standard, video standard support can be easily accomplished by utilizing the reinitialization feature.

The real time display output RGB drives a computer monitor and provides full resolution real time display of field sequential stereoscopic video.

The central timing generator 1120 forms all timing references for the real time display output RGB. The timing generator has a free-running line counter which times out horizontal timing signals such as sync, clamp, and blanking pulses. The line counter in turn clocks a vertical line counter which times out the vertical intervals and provides timing information used to generate vertical timing signals such as vertical sync and blanking. A synchronous state machine sequences through the appropriate output field sequence for the real time display.

The camera controller real time display generates a four fold interlaced field sequential video sequence where two of the interlaced fields correspond to the left image odd and even fields. Similarly, two of the interlaced fields correspond to the right image odd and even fields. The output sequence is chosen such that a four fold interlaced field sequence yields flickerless video. This requires an alternating right-left sequence. Further, the sequence is chosen such that the vertical image size is maximized. The default field sequence is left-odd, right-odd, left-even, right-even. A sequence of four stereo fields comprises a stereo frame.

The real time display fields have a fixed timing relationship to the input field sequence. A fixed relationship is chosen in order to minimize the amount of field memory needed, to avoid pointer crossing video artifacts in the active video area, and to obviate the use of input time base correction. This leads to simplifications resulting in more favorable product cost.

In order to generate proper four fold interlaced video, the number of video lines per four field frame is 4N+1 where N is the number of lines per field. This is analagous to a two way interlace systems satisfying the relationship 2N+1 lines per frame where N is the number of lines per field. In a preferred embodiment, the real time display output generates 1049 lines per stereo frame (for NTSC compatible input timing). Because of the locked relationship of input to output fields, 1049 real time display lines are scanned out in the same time period as 1050 input lines are decoded and buffered. Thus, the input lines to real time display output lines differ in duration by the ratio 1049/1050. To accommodate this difference in duration, the phase locked loop circuit 1122 generates an off frequency timing clock which used to form all real time display timing signals.

The central timing generator 1120 forms a clock enable which shifts digitized video data out of the field memories. Video data associated with the right, left, odd, or even input fields is selected at appropriate times to yield the stated real time display field sequence.

The digital video data shifted out of the field memory is then presented to a digital video processing stage 1132 which can digitally modify the data stream to enhance the video image. In the digital processing stage 1132, illustrated in additional detail in FIG. 22, digital filters 1301 with programmable filter parameters affect luma data to eliminate noise. Other digital filters 1302 act on the luma data to peak the luminance. Similarly, a programmable interpolation filter 1304 acts on chroma data to effectively increase the bandwidth of the chroma channel. The outputs of the digital filter stages are then presented to digital to analog converters (DAC) 1305, 1306, and 1307 where the digital luma and chroma data are converted to analog levels. These three DAC's convert the digital luma and multiplexed chroma values to three separate analog output levels. One analog output represents luma (Y) while the other two outputs represent color difference signals U and V. In a preferred embodiment, the digital image enhancement and digital to analog conversion process is realized by a Philips SAA9065 video enhancement and D/A processor.

Figure 22:
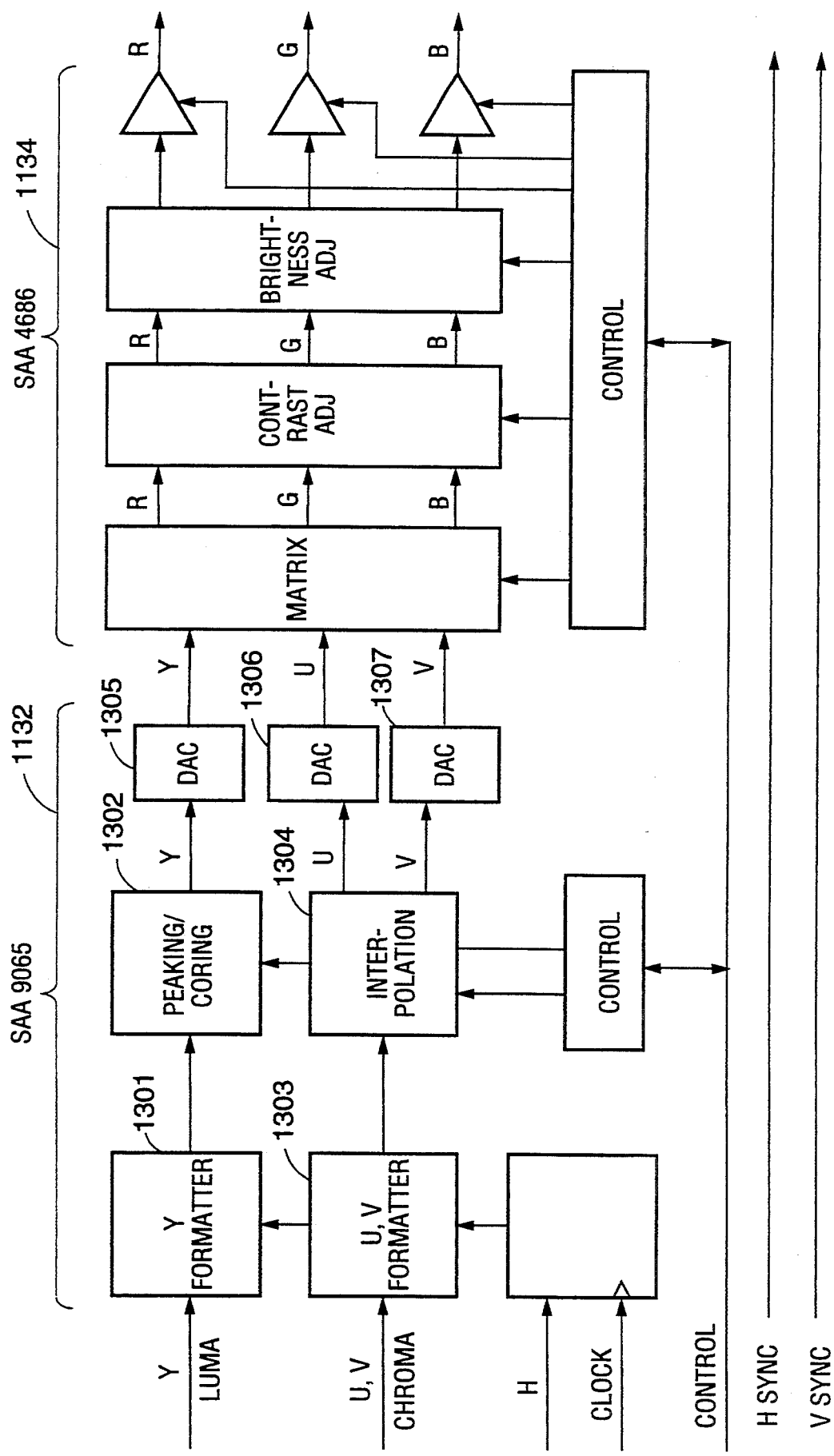
FIG. 22 is a block diagram the digital to analog converter and processing sections of a camera controller according to the present invention.

The analog Y, U, and V signals are presented to a transcoder circuit 1134 which converts them to component RGB analog outputs which then drive the real time display. The transcoder circuit 1134 also contains programmable adjustments for contrast, brightness, and individual gain controls on R, G, and B signal lines, as shown in FIG. 22. In a preferred embodiment, the transcoder circuit is a Philips 4686 video processor.

The record output produces a compressed format suitable for recording the stereoscopic image on a standard video recorder for later playback using the playback controller device.

Data which is shifted from the field memories 1111 is presented to a compression circuit 1128 which compresses data representing horizontal video lines. In the luma channel, the compression circuit averages each adjacent pair of luma data to produce a single luma value. In the chroma channel, multiplexed color difference data is first demultiplexed into separate U and V channels. Each U and V channel is then averaged. A 2:1 horizontal compression is thus performed on the horizontal line. Averaging is performed by adding two values with a binary adder then dividing by two with a binary shift. In a preferred embodiment, the compression circuit 1128 is implemented by shifter and adder circuits realized within a Xilinx 3000 family FPGA.

The compression circuit 1128 feeds the compressed data into a FIFO buffer 1136 which in turn writes the compressed data into the record buffer memory 1138. The record buffer memory 1138 is preferably comprised of a VRAM with an random access read/write port and a sequential read/write port. Data is written using the random access port and read out using the sequential serial port.

Figure 23:
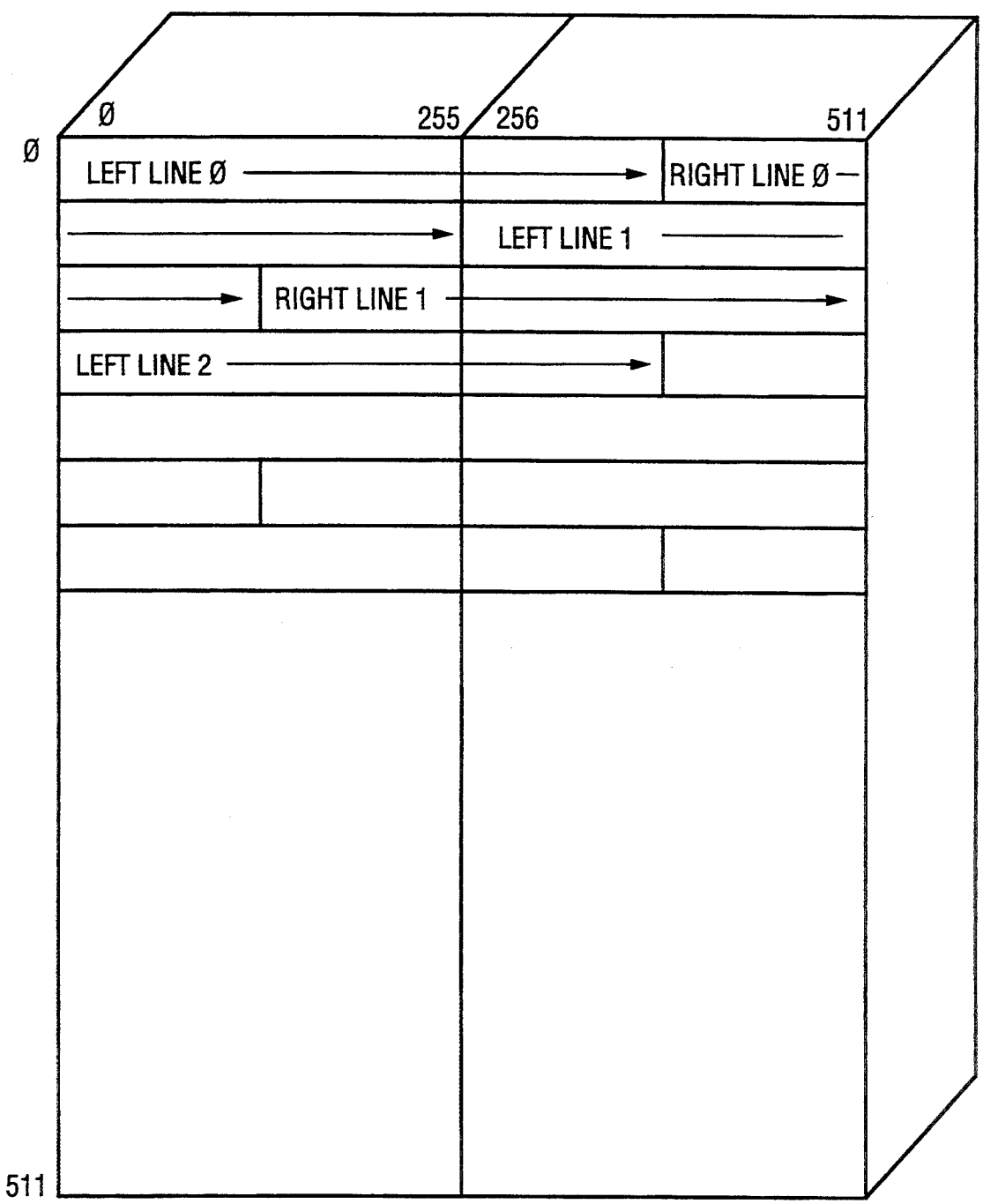
FIG. 23 is a memory allocation map showing the organization of the record output memory buffer.

The organization of the record buffer memory 1138 is illustrated in FIG. 23. The record buffer memory holds video data lines such that a compressed left line is paired with the appropriate compressed right line. When the compressed data is shifted out of the record memory buffer, the data is in the appropriate compressed side field format. In a preferred embodiment, the record buffer memory is implemented using four 256K by 4 VRAM's.

The record output field sequence is maintained in a particular timing relationship to the real time display output field sequence, as shown in FIG. 24. The timing relationship minimizes record buffer size and leads to a more cost effective implementation.

The record buffer memory controller 1130 and all timing generation associated with the record output re-encoding may be provided with a Xilinx 3000 Family FPGA device.

The record buffer memory controller 1130 generates a clock enable signal for shifting data out of the record buffer 1138 and into a digital video encoder 1140. The shifted data represents lines having a compressed left and right side field.

Figure 25:
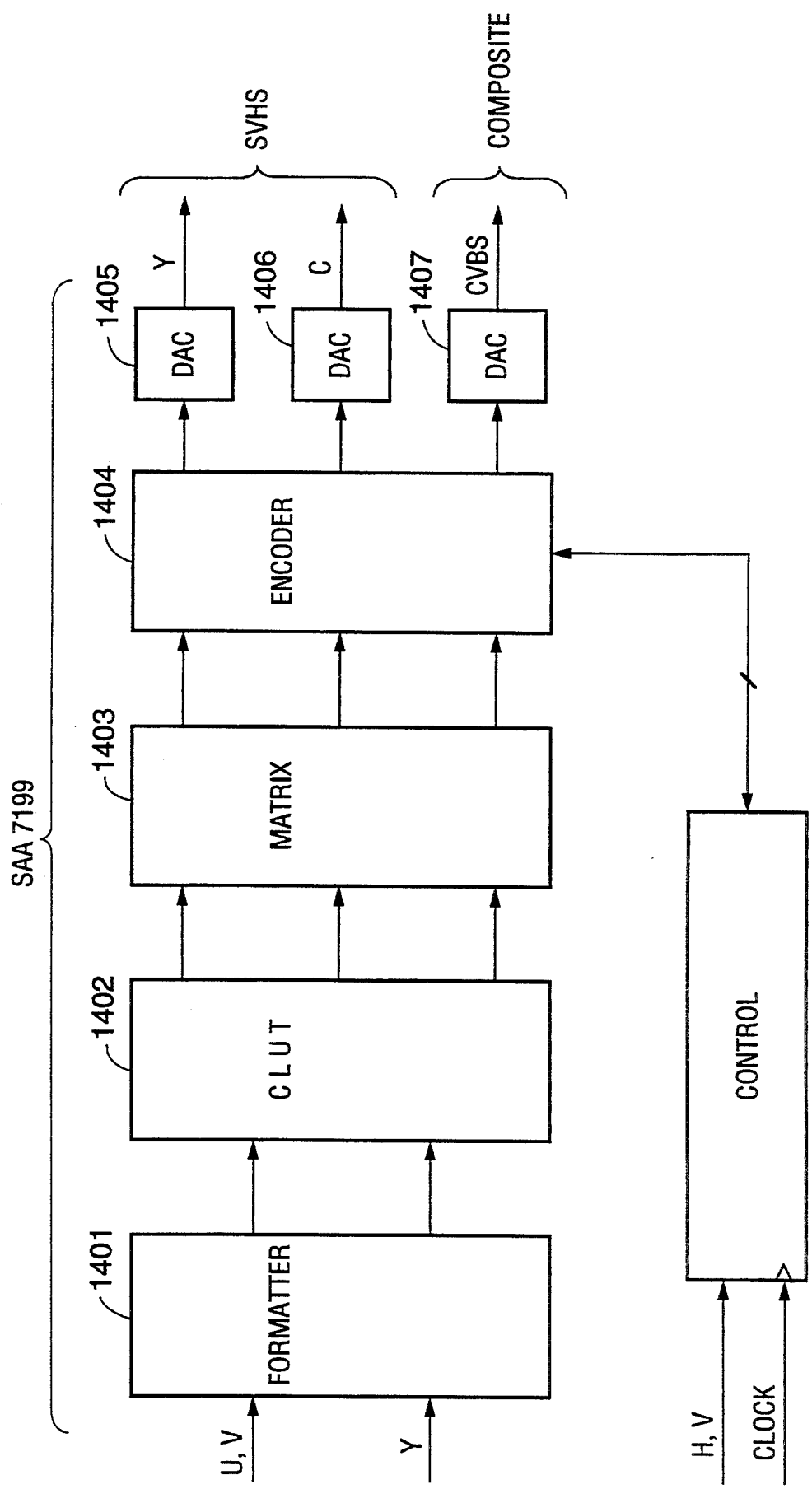
FIG. 25 is a block diagram of the digital video encoder of the camera controller of FIG. 19.

The video encoder is illustrated in more detail in FIG. 25. The video encoder circuit includes a formatter 1401 which demultiplexes the digital video representation. The formatter feeds three color look-up tables 1402 capable of remapping the digital color space. The color look-up table in turn feeds a multistandard video encoder 1404 which modulates color onto the luma signal and forms sync and blanking levels appropriate to a given video standard. Finally, the encoder output, which is still a digital representation of video, is converted to analog by three digital to analog converters 1405, 1406 and 1407. DAC 1407 converts the encoder output to CVBS video format. DAC's 1405 and 1406 convert the encoder output to Y-C component video format where sync and luma are carried on one signal line (Y) and phase encoded color (C) is carried on the other signal line.

As described in U.S. Pat. Nos. 4,967,268 and 4,884,876, right and left images can be adjusted horizontally relative to one another in a process called horizontal image translation (HIT). This HIT affects the location of objects in the viewing space and allows adjustment to the composition of the stereoscopic scene.

Figure 26A:
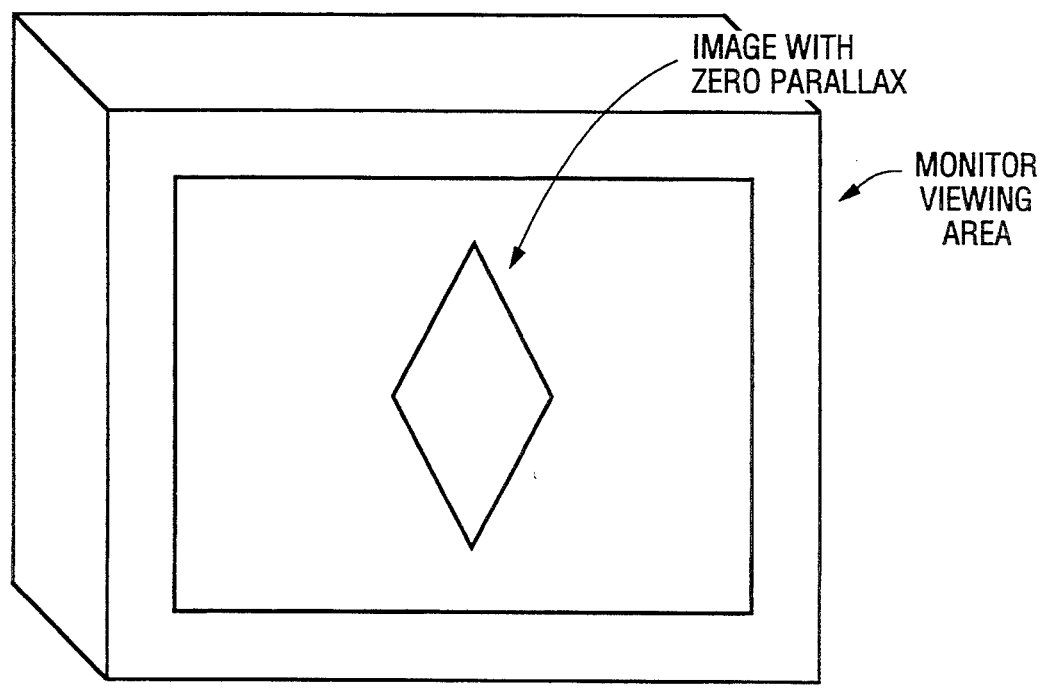
FIG. 26A is a reprentation of a field sequential stereoscopic image with zero parallax.
Figure 26B:
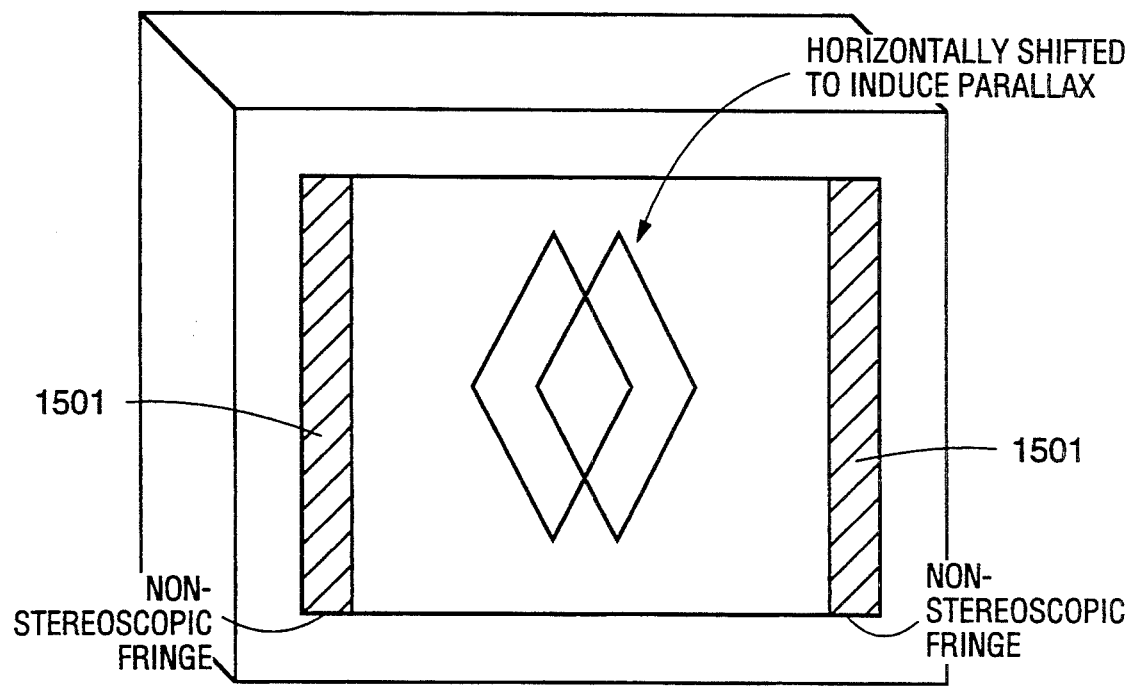
FIG. 26B is a reprentation of a field sequential stereoscopic image with horizontal parallax.

For example, FIG. 26A illustrates an image with zero horizontal parallax as viewed without a viewing device. FIG. 26B illustrates an image with HIT induced horizontal parallax.

A front panel control allows an operator to shift the relative horizontal positions of the left and right images by a small amount. By operating this control the zero parallax setting of a object can be set and the stereoscopic composition of the scene can thus be modified.

The front panel control is polled by the MPU and hardware registers controlling the horizontal position of the right and left images are set.

As the images are shifted relative to one another horizontally, a fringe area 1501 occurs on the sides of the stereoscopic image resulting from portions of the right or left image which are not superimposed. This fringe area has no stereoscopic content. The non-stereoscopic fringe may lead to confusion in depth cues, or at the very least, it is distracting. To prevent this possible distraction, the camera controller horizontal blanking logic blanks any non-stereoscopic fringe arising from horizontal image translation. The MPU writes hardware registers which control the timing of horizontal blanking signals.

The right and left images are shifted in a sequence such that the resulting picture area (with fringes blanked) always remains centered in the viewing area. This sequence alternates the adjustment of the relative positions of the right and left images. For example, if the left image is to be moved to the left relative to the right image, the left image is first moved left by one adjustment increment, then the right image is moved moved right by the same increment. Next, the left image is moved an additional increment to the left, then the right image is moved an additional increment to the right, and so on.

The value of the adjusted horizontal positions of the fields is stored by the camera controller in non-volatile storage such that for subsequent power up and initialization sequences the operator preset values are retained.

Figure 27A:
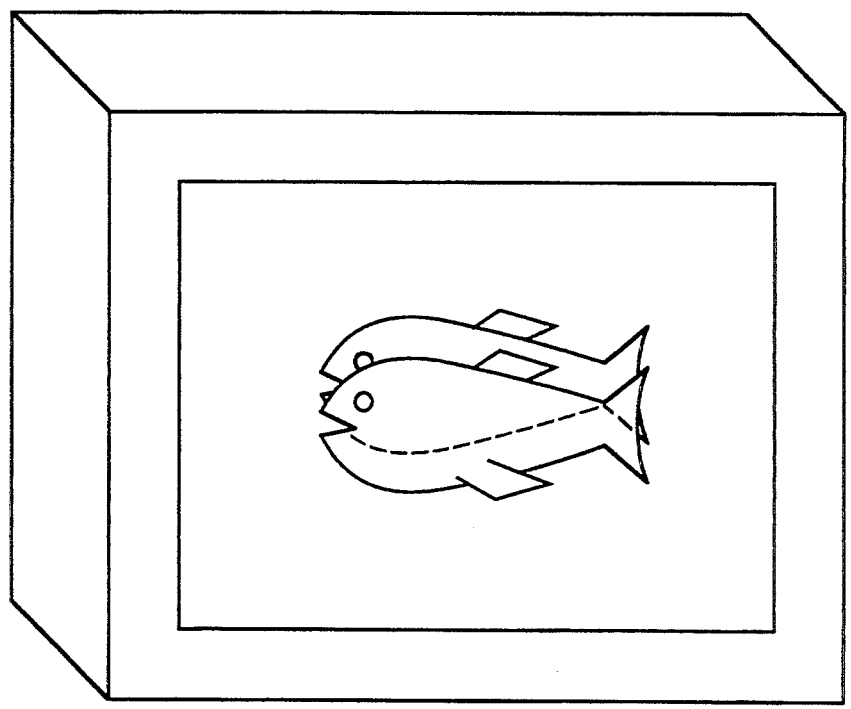
FIG. 27A is a reprentation of a field sequential stereoscopic image with vertical parallax.

A misalignment of the left and right images in the vertical direction may arise from mechanical misalignment of the camera heads or optical misalignment within the cameras themselves. Unlike horizontal parallax, however, this vertical parallax does not lead to depth perception in the image. Instead, it may create discomfort or fatigue while viewing the misaligned images. FIG. 27A illustrates an image with vertical parallax.

Figure 27B:
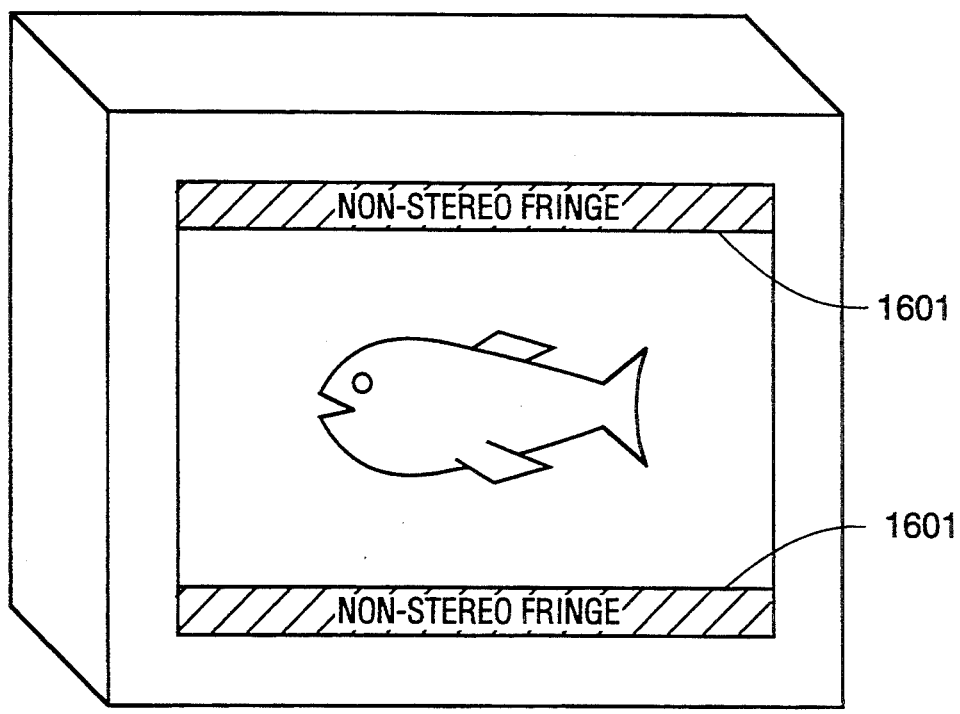
FIG. 27B is a reprentation of a field sequential stereoscopic image with zero parallax.

In order to compensate for misalignment which may occur, the camera controller provides a front panel control which allows an operator to shift the relative vertical positions of the left and right images by a small amount. By operating this control, the vertical parallax is adjusted out and the two images are superimposed with each other, as shown in FIG. 27B.

The front panel control is polled by the MPU, and software adjusts the values which control the vertical position of the right and left images. The MPU also systematically controls the timing of reference pulses which position the video fields on the viewing device.

As the images are shifted vertically relative to one another, a fringe area 1601 occurs on the top and bottom of the stereoscopic image resulting from portions of the right or left image which are not superimposed. This fringe area has no stereoscopic content. The non-stereoscopic fringe may lead to confusion in depth cues, or at the very least, it is distracting. To prevent this possible distraction, the camera controller vertical blanking logic blanks any non-stereoscopic fringe arising from vertically offsetting the right and left image. Again, the MPU controls the timing of blanking signals and systematically performs this blanking as part of the vertical offset control.

The right and left images are shifted in a sequence such that the resulting picture area (with fringes blanked) always remains centered in the viewing area. This sequence alternates the relative adjustment of the right and left images. For example, if the left image is being moved upward relative to the right image, the left image is first moved upward by one line, then the right image is moved downward by one line. Next, the left image is moved an additional line upward, then the right image is moved an additional line downward, and so on.

As with the horizontal offset, the value of the adjusted vertical positions of the fields is stored by the camera controller in non-volatile storage such that for subsequent power up and initialization sequences the operator preset values are retained.

The left and right video decoders 1104 and 1109 contain logic which detects the field rate and color encoding standard-of the input video. The decoders also contain logic which indicates whether the decoder is locked to valid video. The MPU 1124 periodically polls the status of the left and right decoders via a communication bus. Using the status information, the MPU 1124 verifies valid input video and identifies it as one of several widely used standards. The MPU uses the valid video and detected standard information for two purposes, namely automatic standard configuration and input video failure handling.

When the MPU detects the presence of a particular video standard on the video inputs, it programs the timing generation functions 1120 and 1130 of the camera controller with timing parameters appropriate to that video standard. The timing generators are implemented using field programmable gate arrays, as previously described. This type of logic device has the capability to be initialized at power up or re-initialized on command. By automatically sensing and adapting the control timing according to the input video standard, the control generators are simplified and a significant cost advantage is realized.

A stereoscopic image is formed by superimposing a left eye image (with left eye perspective) with a right eye image (with right eye perspective). The left and right video images are received and decoded using completely independent paths on the camera controller. In the event that valid video is missing from either the left or right video channel, then clearly the resulting display and recoded images lack stereoscopic content. During operation, left or right video input may drop out as a result of camera failure, cabling failure, or even decoder failure. In this eventuality, the MPU detects the missing video by polling the status of the video decoders and adjusts the displayed and recorded images accordingly. Typically, the MPU will cause the fields associated with a failed video channel to be blanked. Of course, following a video failure, the resulting image lacks stereoscopic content. However, in many applications it is preferable to degrade the displayed and recorded image to monoscopic and otherwise continue to operate.

We claim:

1. A method for forming a flickerless, field-sequential stereoscopic image from first and second analog video signals, each analog video signal being encoded with sychronization information and color information, comprising:
   digitizing the video signals;
   decoding the digitized video signals;
   storing a first portion of each decoded digitized video signal in an odd video field and storing a second portion of each decoded digitized video signal in an even video field;
   multiplexing the video fields so as to generate a flickerless stereoscopic video image.

2. The method of claim 1, further comprising genlocking the analog video signals with respect to each other.

3. A method for time multiplexing a first analog video source signal and a second analog video source signal, including the steps of:
synchronizing the horizontal and vertical relationship of said first analog video signal and said second analog video signal
generating a first and a second digitized video signal from the first and second analog video source signals, respectively;
separating horizontal and vertical sync timing edges from the first and second digitized video source signals;
generating a first luma signal and a second luma signal by removing the chroma components of the first and second digitized video signals, respectively;
generating a first pair and a second pair of chroma signals by decomposing the chroma components of the first and second digitized video signals, respectively;
combining the first pair of chroma signals and combining the second pair of chroma signals;
storing the first luma signal and the first pair of chroma signals in a first field memory, wherein each unit of storage in the first field memory comprises a single video field in which even and odd video fields are alternately stored; and
storing the second luma signal and the second pair of chroma signals in a second field memory, wherein the second field memory comprises separate storage for even and odd video fields.

4. The method of claim 3, wherein the each of the storing steps comprises writing data to the field memory in ascending address order.

5. The method of claim 3, wherein the each of the storing steps comprises writing data to the field memory in descending address order.

6. The method of claim 3, further comprising:
filtering each of the first and second luma signals to eliminate noise and peak the luminance;
increasing the bandwidth of each of the first and second pair of chroma signals; and
converting each of the first and second luma signals and each of the first and second pair of chroma signals to analog signal levels.

7. The method of claim 6, wherein each of the storing steps are suspended so as to generate a still image from the analog signal levels.

8. The method of claim 6, further comprising generating a four fold interlaced video field sequence, wherein two of the interlaced fields correspond to odd and even video fields of the first field memory, respectively, and two of the interlaced fields correspond to odd and even video fields of the second field memory, respectively, and wherein the sequence is chosen so as to generate a flickerless video image.

9. The method of claim 8, wherein the signals stored in the first field memory correspond to a left perspective image and the signals stored in the second field memory correspond to a right perspective image, and wherein the sequence of video fields is left-odd, right-odd, left-even, right-even.

10. The method of claim 8, wherein the sequence is chosen to maximize vertical image size.

11. The method of claim 8, further comprising centering the video image within a viewing area.

12. The method of claim 11, wherein the centering step comprises incrementally shifting one image then incrementally shifting the other image so as to alternately adjust the relative positions of the images.

13. The method of claim 12, further comprising storing the amount of relative adjustment of the images in non-volatile storage.

14. The method of claim 12, wherein the shifting of images generates fringe areas in the viewing area having no stereoscopic video signal content, and further comprising blanking the fringe areas.

15. An apparatus for processing analog video source signals from a first camera and a second camera in order to generate a real time display output and composite and component record outputs, wherein the first camera provides a first source signal and the second camera provides a second source signal, each source signal being encoded with sychronization information and color information, comprising:
means for digitizing the source signals;
means for decoding the digitized source signals;
means for storing a first portion of each decoded digitized source signal in an odd video field;
means for storing a second portion of each decoded digitized source signal in an even video field;
means for multiplexing the video fields so as to generate a flickerless stereoscopic video image.

16. An apparatus as in claim 15, further comprising means for synchronizing the horizontal and vertical relationship of the source signals.

* * * * *